United States Patent
Ohhashi et al.

(10) Patent No.: US 7,023,573 B2
(45) Date of Patent: Apr. 4, 2006

(54) IMAGE TRANSMISSION DEVICE AND IMAGE TRANSMISSION METHOD

(75) Inventors: Shinichiroh Ohhashi, Nara (JP); Tsutomu Yoshimoto, Yamatotakada (JP); Syoichiro Yoshiura, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 847 days.

(21) Appl. No.: 09/929,405

(22) Filed: Aug. 14, 2001

(65) Prior Publication Data
US 2002/0018248 A1    Feb. 14, 2002

(30) Foreign Application Priority Data
Aug. 14, 2000   (JP)   .............................. 2000-245752
Jul. 18, 2001   (JP)   .............................. 2001-218074

(51) Int. Cl.
G06F 15/00    (2006.01)
H04N 1/04     (2006.01)

(52) U.S. Cl. ...................................... 358/1.15; 358/474

(58) Field of Classification Search ............... 358/1.15, 358/401, 444; 382/135, 137, 155, 165, 159, 382/181
See application file for complete search history.

(56) References Cited

U.S. PATENT DOCUMENTS 5,652,803 A * 7/1997 Tachikawa et al. ......... 382/135

FOREIGN PATENT DOCUMENTS

| JP | 05-022591  | 1/1993  |
|----|------------|---------|
| JP | 8-130657   | 5/1996  |
| JP | 08-317180  | 11/1996 |
| JP | 2000-032238| 1/2000  |
| JP | 2000-196873| 7/2000  |

* cited by examiner

*Primary Examiner*—Kimberly Williams
*Assistant Examiner*—Charlotte M. Baker
(74) *Attorney, Agent, or Firm*—Edwards Angell Palmer & Dodge, LLP; George W. Hartnell; David G. Conlin

(57) ABSTRACT

An image transmission device, which is connected to such external devices as a facsimile, etc., via a public line and a computer network and can be operated in accordance with a request for image data transmission from the external device, includes a scanning section for scanning a document image and generating image data, a fax sending/receiving section for sending the image data to the external device by the request of the external device, a specific document judging section for judging whether or not the image data generated in the scanning section is that of a specific document, and a control section for controlling transmission of the image data by the fax sending/receiving section according to a result of judgment by the specific document judging section, thereby preventing the forgery of a specific document that is enabled by obtaining the image data of such specific documents as paper money, valuable securities, etc., scanned by the image transmission device or inputted from the outside to the image transmission device.

24 Claims, 14 Drawing Sheets

F I G. 6

| IMAGE QUALITY | DETAILS | SCANNING RESOLUTION (MAIN SCANNING × SUB SCANNING) |
|---|---|---|
| NORMAL LETTERS | FOR A DOCUMENT WITH NORMAL-POINT LETTERS | 200 × 100dpi |
| SMALL LETTERS | FOR A DOCUMENT WITH SMALL LETTERS AND DETAILED DRAWINGS (SCANNING WITH A DENSITY WHICH IS TWICE THE DENSITY FOR 'NORMAL LETTERS') | 200 × 200dpi |
| FINE | FOR A DOCUMENT WITH COMPLICATED DRAWINGS /ILLUSTRATIONS (TRANSMISSION WITH FINER IMAGE QUALITY THAN 'SMALL LETTERS' IS AVAILABLE) | 200 × 400dpi |
| HIGH DEFINITION | FOR A DOCUMENT WITH COMPLICATED DRAWINGS /ILLUSTRATIONS (TRANSMISSION WITH THE FINEST IMAGE QUALITY IS AVAILABLE) | 400 × 400dpi |

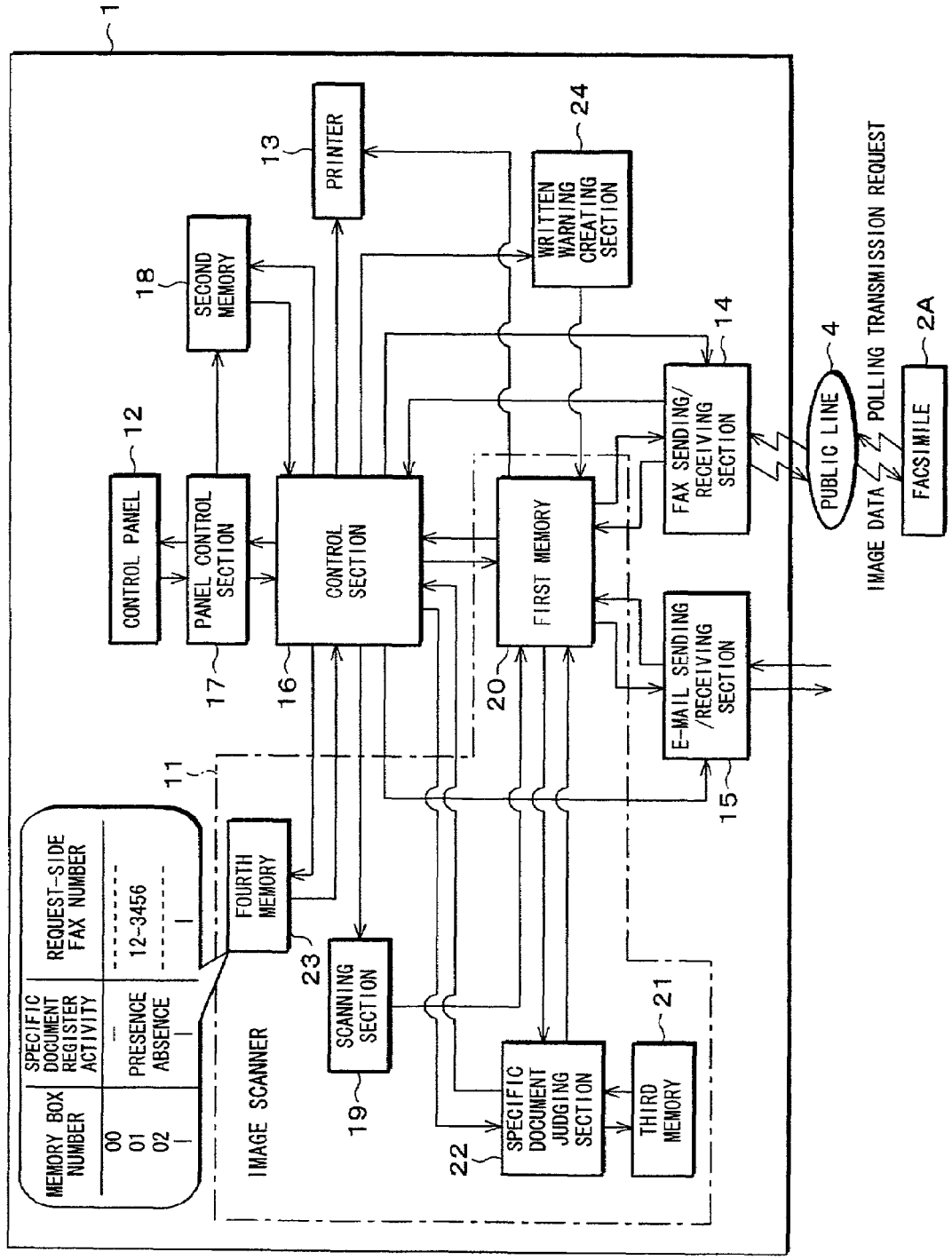

IMAGE TRANSMISSION DEVICE AND IMAGE TRANSMISSION METHOD

FIELD OF THE INVENTION

The present invention relates to an image transmission device and an image transmission method, provided with a mode to prevent forgery of specific documents, such as paper money and valuable securities.

BACKGROUND OF THE INVENTION

In recent years, a digital color copy machine which has superior color reproducibility and therefore can provide a reproduced image extremely close to its original is manufactured, that is the fruit of years of a technological development. There is concern, however, that this superior digital color copy machine is likely to be illegally used in the forgery of paper money, valuable securities and the like.

Generally, it is a digital color copy machine that is used in forgery. Therefore, a digital color copy machine provided with a mode to prevent forgery ("forgery prevention mode", hereinafter) as a countermeasure is commercially available today. The digital color copy machine having the forgery prevention mode has such an arrangement as to pre-scan an original document when it is set on a document table, and when judging that the document thus set is identical with a specific document registered in a device in advance, prohibit the execution of image formation for this document, or permit the execution of image formation provided that the output image is given a particular process, such as a process to attach a particular pattern for tracking use, or deformation processes including a variable magnification process, an oblique face process, a mirror image process, and the like, so as to prevent accurate image formation.

As discussed, the forgery of a specific document commonly involves the use of a digital color copy machine. Consequently, the use of an image transmission device for forgery purposes, for example, forging a specific document by faxing a document, has been overlooked.

However, as color facsimiles have been popularized, and scanners, image processing and printing techniques have been improved, the use of an image display device, such as a facsimile in forgery would be anticipated in near future. Therefore, there is growing concern that, in addition to paper money and valuable securities, those requiring careful attention in terms of copying, such as a season ticket, a commutation ticket, and the like, and copyright works are transmitted by such image transmission devices as a facsimile and a network-connected personal computer, so as to be used for forgery at a receiving end.

Further, Japanese Unexamined Patent Publication No. 130657/1996 (Tokukaihei 8-130657 published on May 21, 1996) discloses a facsimile which prohibits transmission of an image with respect to a designated destination in the case where the image of a transmission document is a special one. Namely, the publication No. 130657/1996 discloses a facsimile which is provided with input means for scanning a document and inputting a color image, transmission means for faxing the color image thus inputted by the input means, special document judging means for judging whether the color image inputted by the input means is a special document, copying of which is prohibited, such as paper money, valuable securities, or the like, and control means for controlling the transmission means to prohibit the transmission of the inputted color image in the case where the judging means judges that the inputted color image is the special document.

However, forgery using the image transmission device should be taken into consideration not only when the scanned image is directly transmitted to a receiver by the facsimile as in the case of the above publication, but also when such an image as to be scanned and temporarily stored in a memory is transmitted by request of an external device (or retrieved from the external device) as in the case of performing polling transmission by facsimile.

More specifically, in the case of the facsimile polling transmission (receiving), image data which are scanned by a transmitter facsimile and temporarily stored in a memory are transmitted (retrieved) to a receiver facsimile in response to a transmission request from the receiver facsimile. In that case, it is feasible that the image data of a specific document are retrieved from the receiver facsimile so as to use it for forgery, that should be taken into consideration accordingly.

Further, in the case of a computer, such as a personal computer connected with a computer network, etc., it is possible in general to transfer image data to a different computer terminal by request thereof. Therefore, it is feasible that forgery is committed by retrieving image data stored in a computer terminal from a different computer terminal. The forgery like this should also be taken into consideration.

Further, recently, there has been introduced a facsimile (network scanner) which is connected to a computer terminal via a computer network and can be operated in response to a request from the computer terminal. In a network environment where this network scanner is introduced, it is possible, for example, to transfer document image data scanned by the network scanner to a predetermined computer terminal in response to a request from a computer terminal on the network, and capture a specific image from a computer terminal on the network by the remote control of the network scanner. Therefore, in this network environment, there is a growing need to monitor transmission of the image data of the specific document from a computer terminal on the network by the remote control of the network scanner.

Further, in such a system that the scanned image data is first stored in an information management device, such as a server, thereafter transferring the image data to an external receiver by request thereof, there is a growing need to monitor transmission of the image data of the specific document at the server's end.

As discussed, it is necessary to monitor transmission of the image data of the specific document in either of an image transmission device which transmits the image data stored in advance to an external receiver by request thereof and an image transmission device which first prepare image data by request of an external receiver, then, transmits the image data to the external receiver when ready. The publication No. 130657/1996 does not disclose an image transmission device having the foregoing arrangement in which the transmission of a special document is prohibited.

SUMMARY OF THE INVENTION

It is an object of the present invention to provide an image transmission device and an image transmission method which are capable of preventing an activity of forging a specific document, where either the image data of such a specific document as paper money or valuable securities scanned by an image transmission device or image data of a specific document inputted to the image transmission device from the outside is obtained from an external device. Further, another object of the present invention is to provide an image transmission device and an image transmission method capable of preventing with an easy configuration the forgery of a specific document with the use of such an image transmission device as a facsimile, and in particular, an image transmission device and an image transmission method capable of preventing, and tracking, the activities of forging an image of a specific document by retrieving the image that is stored in the image transmission device from an external device.

In order to attain the foregoing object, an image transmission device according to the present invention, which is connected to an external device via a communications network and can be operated in accordance with a request from the external device, includes: an image scanning section for scanning a document image and generating image data; an image transmitting section for transmitting the image data to an external image receiving device in response to a request for transmission of the image data sent from the external device; a specific image judging section for judging whether or not the image data generated in the image scanning section is identical with specific image data; and a transmission control section for controlling the transmission of the image data in the image transmitting section based on a result of judgment by the specific image judging section.

With this arrangement, in the case where the image data generated in the image scanning section is judged to be specific image data, the transmission of the image data by the image transmitting section is controlled, thereby preventing the forgery of a specific document that is enabled by obtaining the image data of the specific document generated in the image scanning section from the outside.

In order to attain the foregoing object, an image transmission device according to the present invention, which is connected to an external device via a communications network and can be operated in response to a request from the external device, includes: an image receiving section for receiving image data transmitted from an external image transmission device; an image transmitting section for transmitting the image data to an external image receiving device in response to a request for transmission of the image data sent from the external device; a specific image judging section for judging whether or not the image data received by the image receiving section is identical with specific image data; and a transmission control section for controlling the transmission of the image data in the image transmitting section based on a result of judgment by the specific image judging section.

With this arrangement, in the case where the image data received from an external image transmission device is judged to be specific image data, the transmission of the image data by the image transmitting section is controlled, thereby preventing the forgery of a specific document that is enabled by obtaining from the outside the image data of the specific document externally inputted to the image transmission device.

In order to attain the foregoing object, an image transmission device according to the present invention includes: an image scanning section for scanning an image of a document; first storage means for storing image data of the document scanned by the image scanning section; specific document judging means for judging whether or not the document scanned by the image scanning section is a specific document; and warning means for, when the document is judged as the specific document by the specific document judging means, and a request for retrieving an image is sent from an external device with respect to image data of the document judged as the specific document, giving a warning to the external device.

With this arrangement, a warning can be given to a person who attempted to commit the forgery of a specific document by obtaining the image data stored in the first memory means from an external device.

In order to attain the foregoing object, an image transmission device according to the present invention includes: an image scanning section for scanning an image of a document set; first storage means for storing image data of the document scanned by the image scanning section; specific document judging means for judging whether or not the document scanned by the image scanning section is a specific document; storage control means for, when it is judged that the document is the specific document by the specific document judging means, clearing the image data stored in the first storage means while storing information indicating that the document is judged to be the specific document in second storage means; and warning means for, when an external device sends a request for retrieving the image data thus judged to be of the specific document and cleared from the first storage means, giving a warning to the external device.

With this arrangement, it is possible not only to surely prevent the forgery of a specific document by obtaining the image data stored in the first memory means from an external device but also to give a warning to a person who attempted to commit the forgery.

In order to attain the foregoing object, an image transmission method according to the present invention includes the steps of: (i) inputting image data; (ii) judging whether or not the image data is specific image data; (iii) receiving a request for transmission of the image data via a communications network; and (iv) transmitting the image data in response to the request for transmission of the image data, wherein, in the step (iv), the transmission of the image data is controlled according to a result of judgment in the step (ii).

With this method, when it is judged that the inputted image data is specific image data, the transmission of the image data is controlled (preferably, prohibited, or restricted), thereby preventing the forgery of a specific document that is enabled by obtaining the image data of the specific document via the communications network.

In order to attain the foregoing object, an image transmission method according to the present invention includes the steps of: scanning an image of a document; storing image data of the scanned document; transmitting the stored image data to an external device; judging whether or not the scanned document is a specific document; and giving a warning to an external device when the document is judged to be the specific document, and the external device sends a request for retrieving the image data judged to be of the specific document.

With this method, a warning can be given to a person who attempted to commit the forgery of a specific document by obtaining the stored image data from an external device.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6 is an explanatory view showing levels of scanning resolution of a scanner, with corresponding image quality modes according to one embodiment of the present invention.

FIG. 7 is a block diagram showing a configuration of a digital image forming device as an image transmission device according to another embodiment of the present invention.

DESCRIPTION OF THE EMBODIMENTS

[First Embodiment]

The following will explain one embodiment of the present invention with reference to FIGS. 1 to 6.

Figure 1:
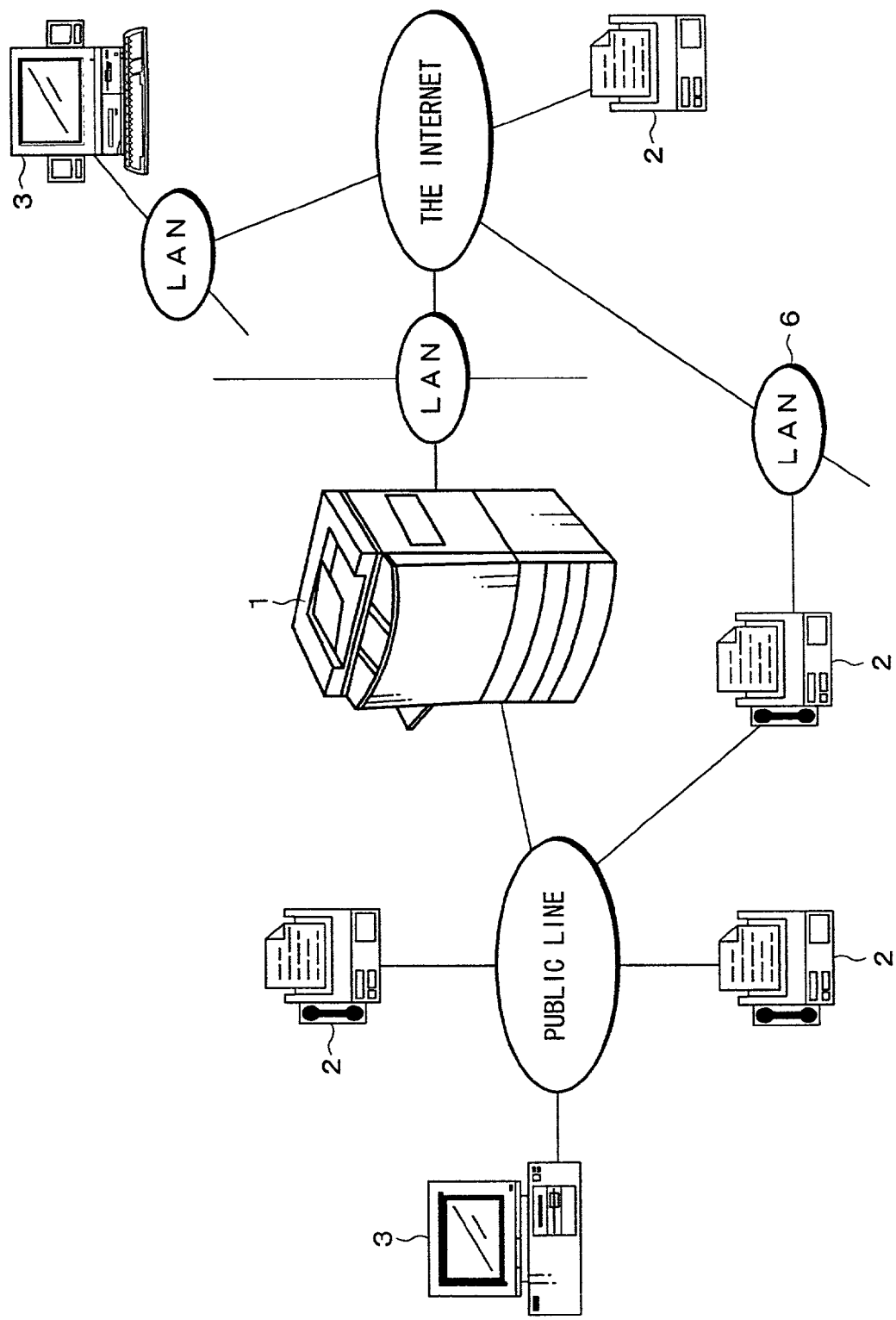
FIG. 1 is an explanatory view showing an example of a network connection involving an image transmission device according to one embodiment of the present invention.

As shown in FIG. 1, a digital image forming device 1 as an image transmission device according to one embodiment of the present invention is a digital combined machine provided with a copy mode, a facsimile mode, a printer mode, and the like, and is also a device over a computer network, which is connected to external devices, such as a facsimile 2, a personal computer 3 and the like, via a public line (telephone line) and/or the Internet.

Figure 2:
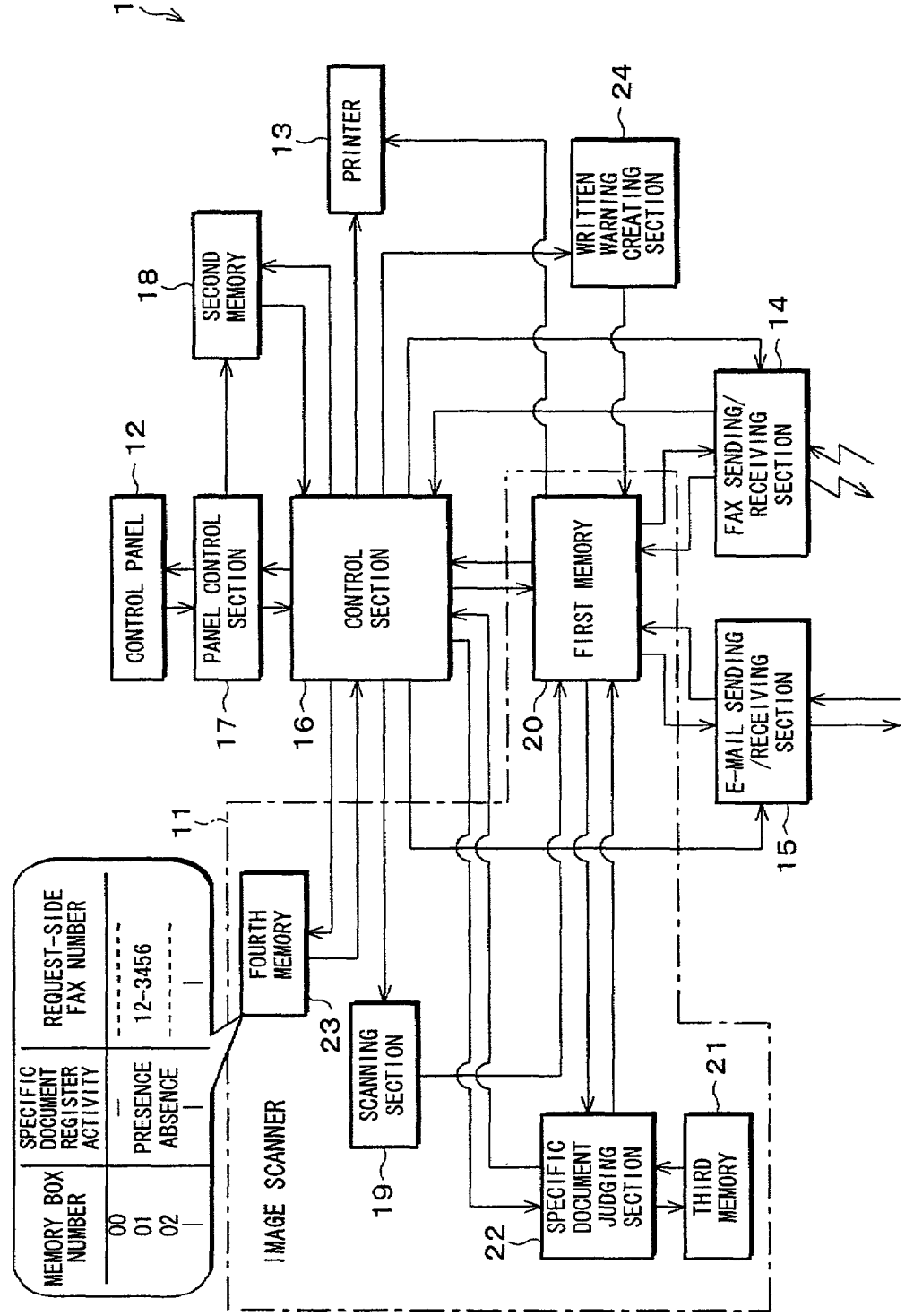
FIG. 2 is a block diagram showing a configuration of the image transmission device according to one embodiment of the present invention.

FIG. 2 is a block diagram schematically showing a configuration of the digital image forming device 1. The digital image forming device 1 includes an image scanner 11, a control panel 12, a printer 13, a fax sending/receiving section (image transmitting section) 14, an e-mail sending/receiving section 15, a written warning creating section (warning means) 24, a control section (memory control means, call refusing means) 16 controlling all of these, and others.

The control panel 12 is provided to enable a user to make various settings for different modes (a copy mode, a fax mode, a printer mode, etc.), such as setting image quality upon fax transmission, inputting a destination of transmission, registering image data for polling transmission use, and the like. The operation of the control panel 12 is controlled by the control section 16 via the panel control section 17. The details of the setting made at the control panel 12 are displayed by a display in the control panel 12 while being stored in a second memory 18.

The image scanner 11 includes a scanning section (image scanning section) 19 for scanning a document image, and a first memory (image storing means) 20 for storing the scanned document image data. In the first memory 20 is provided a plurality of memory boxes which is not shown and set. The memory boxes, upon receipt of a request for retrieving image data which are registered in the memory boxes (polling transmission request) from an external device, transmits the registered image data to a polling request side device (external device). Further, the image scanner 11 is provided with a third memory 21 in which sample data of one or more specific document is stored in advance, a specific document judging section (specific image judging means) 22 for judging whether or not the scanned document is a specific document, and a fourth memory (second storing means) 23 for storing information that a specific document is registered. The specific document judging section 22 judges whether or not the scanned document is a specific document by making a comparison between the document image data stored in the first memory 20 and the sample data of one or more specific document stored in advance in the third memory 21. Note that, operational processes in the judgment of a specific document by the image scanner 11 will be explained in detail later. Further, the fourth memory 23 stores, in each memory box, information of whether or not an activity of registering a specific document ("specific document register activity", hereinafter) has been executed by using each memory box. Each memory box thus stores information of the "presence or absence of the specific document register activity", and when a polling transmission request is sent to a memory box indicating the "presence of the a specific document register activity", the fourth memory 23 further stores the fax number of a polling request side (destination) facsimile.

The printer 13 outputs an image by using the document image data stored in the first memory 20.

The written warning creating section 24, when a polling transmission request is sent to a memory box which was used for forgery purposes, creates a document of warning with respect to a polling request side device (external device).

Figure 3:
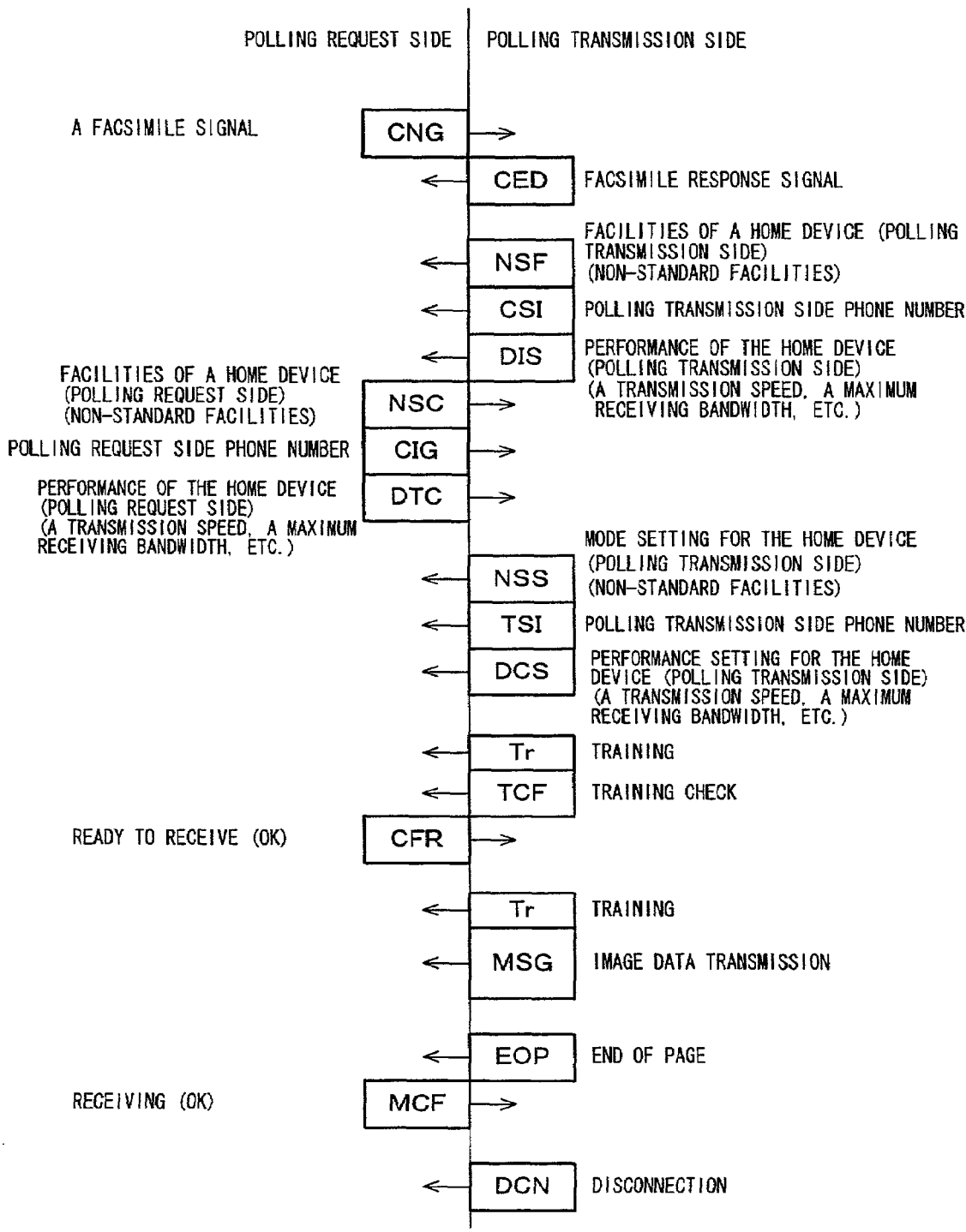
FIG. 3 is an explanatory view showing an example of a procedure of polling communications by facsimile.

FIG. 3 indicates a communication procedure in the case of polling communications by facsimile. As shown in FIG. 3, first of all, a polling request side device (here, an external device attempting to output document data registered in an image transmission device according to the present invention by retrieving it) transmits a CNG signal indicating that the polling request side device is a facsimile. Next, in response to the CNG signal, a polling transmission side device (here, the image transmission device according to the present invention) transmits a CED signal indicating that the polling transmission side device is a facsimile.

Thereafter, the polling transmission side device transmits a NSF signal indicating original facilities (a confidential communication mode, a relay mode, etc.) pertaining to the polling transmission side device in the mutual communication, to the polling request side device. Further, the polling transmission side device transmits the following signals to the polling request side device: a CSI signal indicating the phone number (20 digits maximum) of the polling transmission side device ; and a DIS signal for notifying the polling request side device of the receiving performance (data transmission speed, resolution, a maximum receiving bandwidth, etc.) of the polling transmission side device (receiving end).

Corresponding to the transmission of the NSF, CSI and DIS signals by the polling transmission side device, the polling request side device, in order to show that a polling request is to be made, transmits the following signals to the polling transmission side device: a NSC signal indicating the original facilities (a confidential communication mode, a relay mode, etc.) of the polling request side device in the mutual communication, a CIG signal indicating the phone number (20 digits maximum) of the polling request side device, and a DTC signal which is a signal for notifying the polling transmission side device of the performance of the polling request side device.

In the polling communication, as discussed, the polling request side device declares, by transmitting the NSC, CIG and DTC signals, that the polling communication is to be carried out.

Corresponding to the transmission of the NSC, CIG and DTC signals by the polling request side device, the polling transmission side device transmits the following signals to the polling request side device: an NSS signal indicating the setting of the original facilities (a confidential communication mode, a relay mode, etc.) of the polling transmission side device in the mutual communication; a TSI signal indicating the phone number (20 digits maximum) of the polling transmission side device; and a DCS signal for notifying the polling request side device of the performance setting of the home device (transmitting end).

As explained, after mutually transmitting signals indicating information of home devices, such as facilities, the phone number and performance, between the sending end and the receiving end, a Tr signal and a TCF signal which is a training check signal are transmitted from the transmitting end to the polling request side device for training purposes. Based on the transmission speed of these signals, it is checked whether or not the line is ready for use. When training terminates under a normal condition, and it is checked that the line is ready for use, a CFR signal indicating that the preparation for receiving is done (OK) is transmitted from the polling request side device to the polling transmission side device.

Thereafter, an MSG signal which is an image data signal is transmitted from the polling transmission side device to the polling request side device. In that case, for a further check, a Tr signal is attached to the front of the MSG signal to be transmitted. Then, when the transmission of image data signals corresponding to one page terminates, an EOP signal which is an "end of page" signal is transmitted from the polling transmission side device to the polling request side device. In response to this, the polling request side device transmits an MCF signal indicative of the proper receipt of the image data signal to the polling transmission side device.

In the case where there is image data corresponding to a next page, the transmission and receipt of an MSG signal is repeated. In the case where there is no more image data to be transmitted, the polling transmission side device transmits a DCN signal indicative of the termination of data transmission and the disconnection of the line to the polling request side device, thereby terminating a series of facsimile polling communications.

Figure 4:
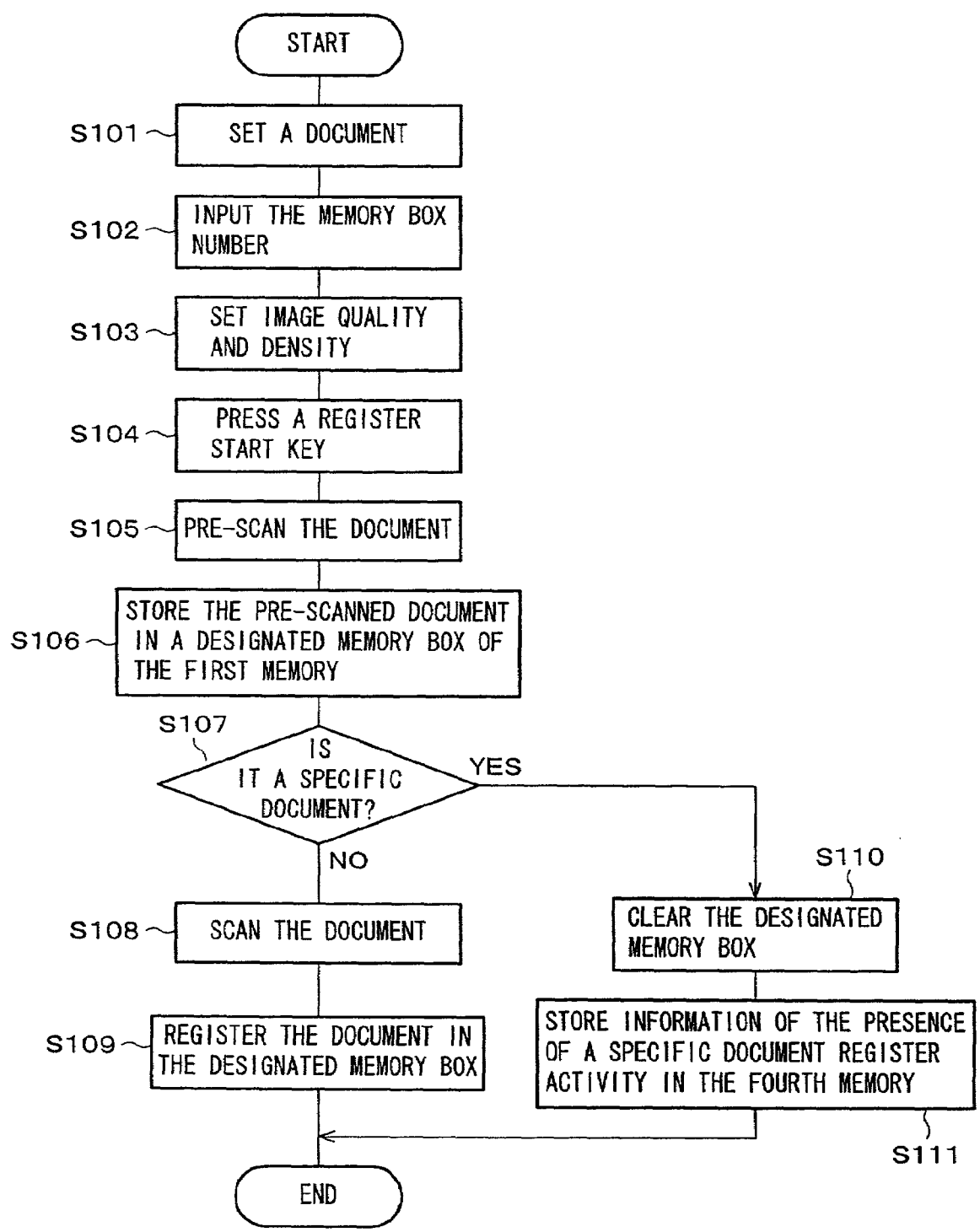
FIG. 4 is a flow chart showing the flow of processes in the presence of a specific document register activity in one embodiment of the present invention.
Figure 5:
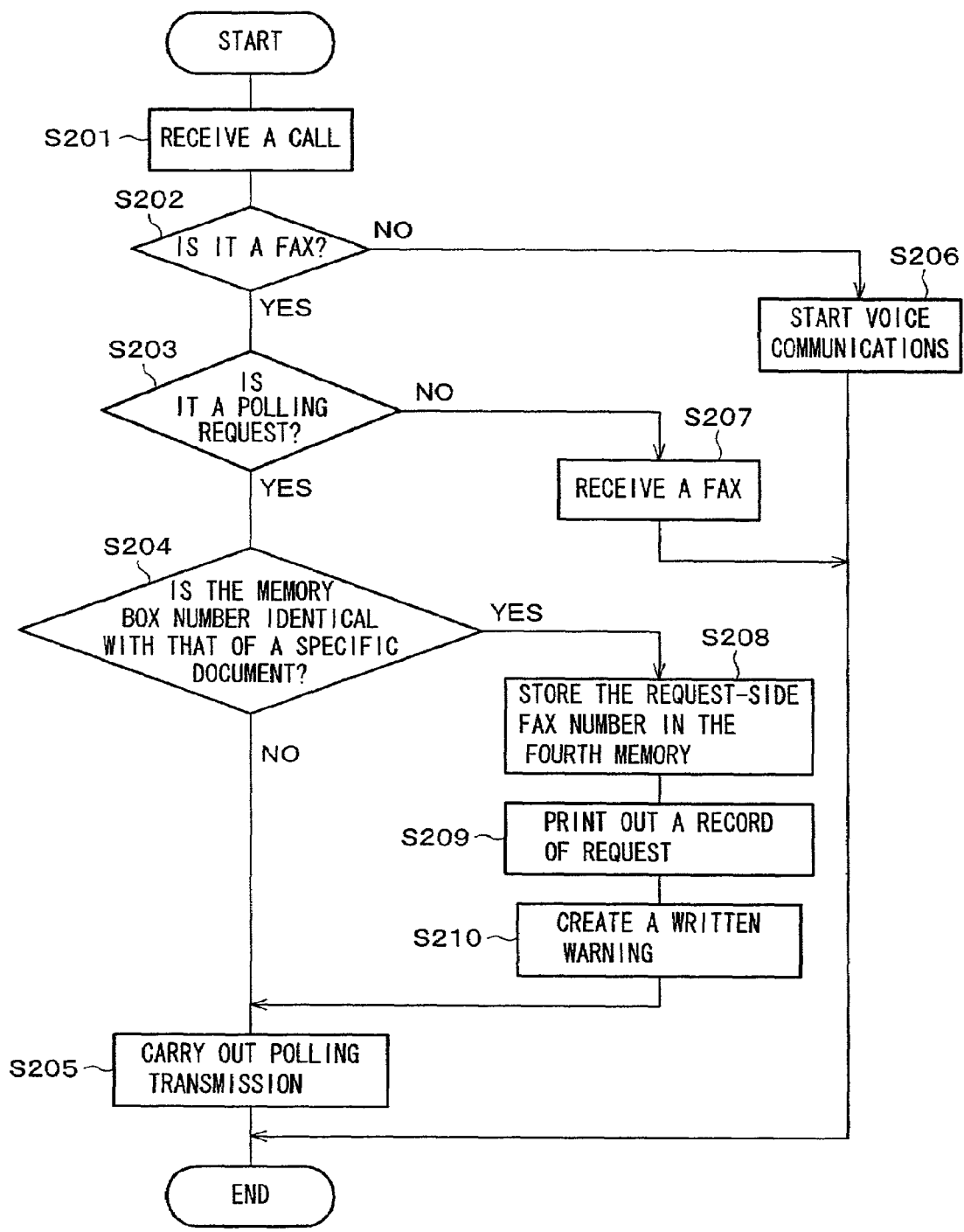
FIG. 5 is a flow chart showing the flow of processes in the case where a request for retrieving image data is sent to a memory box subject to the specific document register activity in one embodiment of the present invention.

Next, the following will explain an operational process in the case where there is the specific document register activity by the image scanner 11 and an operational process in the case where a retrieval request is made with respect to a memory box subject to the specific document register activity, with reference to the flow charts of FIGS. 4 and 5. Note that, here, a forgery prevention treatment in the case of fax transmission will be explained.

First, a user sets an original document for transmission at the scanning section 19 (S101) and inputs the number of a memory box, in which the document thus set is to be registered, through the control panel 12 (S102), thereby storing the number of the memory box in the second memory 18. In the present example, it is assumed that the number of the memory box for register is set at "01".

Next, the user operates the control panel 12 so as to set image quality and density according to the size and density of letters, and a type (for example, a photograph type, a non-photograph type, etc.) of the document for transmission thus set (S103). As with the foregoing, the setting of image quality and density is also stored in the second memory 18.

Here, the image quality refers to scanning resolution by the scanning section (scanner) 19, which includes the following four modes as shown in FIG. 6: "normal letters"; "small letters"; "fine"; and "high definition". Note that, details and scanning resolution of each mode are described in FIG. 6. In addition, the density includes the following three modes: "automatic"; "thick"; and "thin". The image quality and density can be arbitrarily selected from these modes and set by the user. Here, an example of the setting is as follows: the image quality is set on "high definition" (the scanning resolution is 400 dpi×400 dpi), and the density is set on "automatic".

After finishing setting the document for register in step S103, the user presses a register start key of the control panel 12 (S104), thereby performing pre-scanning for judging whether or not the document set at the scanning section 19 is a specific document (S105). The document image data pre-scanned in step S105 is stored in a designated memory box of the first memory (image memory) 20 (S106). The specific document judging section 22 makes comparison between the image data of the registered document stored in the designated memory box of the first memory 20 and the sample data of one or more specific document stored in the third memory 21, thereby judging whether or not the registered document is a specific document (S107).

As a result of the judgment in step S107, when it is judged that the registered document is not a specific document, the scanning section 19 scans the document set at the scanning section 19 with the image quality and density set by the user in step S103 (for example, the image quality: "high definition"; and the density: "automatic") (S108), thereby storing the image data of the registered document in a region on the first memory 20, the region corresponding to the number of the memory box "01" inputted in step S102 (S109).

On the other hand, when it is judged in step S107 that the registered document is a specific document, then in step S110, the stored data of the registered document in the designated memory box of the first memory 20 is erased. At the same time, in step S11, information indicative of the presence of the specific document register activity (forgery) in the memory box "01" is stored in the fourth memory 23.

Next, the following will explain an operational process in the case where a retrieval request is sent from a different facsimile to the memory box "01" subject to the specific document register activity.

When a call is received from the different facsimile (S201), by judging whether the CNG signal comes or not, it is judged whether the call is of the facsimile communications or voice communications (S202). As a result of the judgment in step S202, if it is not of the facsimile communications, it is judged that the call is of the voice communications, thereby starting the voice communications (S206).

On the other hand, as a result of the judgment in step S202, if the call is of the facsimile communications, it is judged whether or not it is a request for retrieving image data (polling request) (S203), and if not, a normal facsimile receiving process is carried out (S207).

As a result of the judgment in step S203, if it is the polling request, it is judged whether the memory box of the polling request is identical with the memory box subject to the specific document register activity (S204). When the memory box of the polling request is different from the memory box subject to the specific document register activity, the image data registered in the memory box of the polling request is transmitted to the polling transmission request side (polling request side) device (S205).

On the other hand, as a result of judgment in step S204, in the case where it is judged that the number of the memory box of the polling transmission request is "01", the fax number "12–3456", for example, of the polling request side (calling station) device that is included in the CIG signal is stored in the fourth memory 23 (S208). Thereafter, a record of the call received indicating that the polling transmission request was sent to the memory box "01" is printed out (S209) At the same time, a written warning against forgery is created at the written warning creating section 24, and the written warning thus created is stored in the memory box "01" (S210). Namely, in the present embodiment, only information indicating that there was the specific document register activity is stored. Therefore, the specific document is not transmitted to the polling request side device. Consequently, since an image cannot be outputted by the polling request side output device, and the fax number of the polling request side device is stored, it is possible to specify where an attempt of forging a specific document is made.

Note that, in the case where the memory box to which a polling request is sent is a memory box subject to the specific document register activity, it is possible to store the identification number (fax number, for example) of the external device (polling request side device) from which a request for retrieving an image registered in the memory was sent, while arranging the control section 16 to be provided with a mode to prevent a future call from this external device. In that case, forgery by this external facsimile 2A can surely be prevented hereafter, including the forgery prevented this time.

As discussed, in a preferable embodiment of the present invention, when it is judged that a document registered at the scanning section 19 is a specific document, only the information indicating that there was the specific document register activity is stored, and when a request for retrieving image data is sent to the memory box subject to the specific document register activity, the fax number of the retrieval request side device is stored, thereby preventing the forgery of a specific image by retrieving and outputting the specific image from an external device having a facsimile mode, such as a different facsimile 2, while specifying the location of the external device, such as the facsimile 2.

As discussed, a preferable embodiment of the present invention has an arrangement in which document image data which are judged to be of a specific document are erased from the memory so as to store only information indicating that the document is judged to be a specific document, and a written warning by facsimile, for example, is sent to an external device which sent a request for retrieving the image data that was judged to be of a specific document and erased from the memory.

With this arrangement, it is possible to surely prevent an image registered in the memory from being obtained through an external device for forgery purposes as well as to give a warning to a person attempting to commit forgery.

Further, as discussed, a preferable embodiment of the present invention has an arrangement in which in the case where an external device requests the retrieval of image data which was judged to be of a specific document and therefore erased from the memory, at least the identification number (fax number, for example) of the external device and information indicating that the external device requested the retrieval of the image data are recorded in an appropriate memory.

With this arrangement, even in the absence of a user in the vicinity of an image transmission device, tracking is available by specifying a person attempting to obtain the image registered in the memory through an external device for forgery purposes, and the location where the forgery would take place.

Further, as discussed, a preferable embodiment of the present invention has an arrangement in which, in the case where an external device sends a request for retrieving image data which is judged to be of a specific document and therefore erased from the memory, a report at least including the identification number (fax number, for example) of this external device and the information indicating that the external device sent a request for retrieving the image data is outputted.

With this arrangement, even in the absence of a user in the vicinity of an image transmission device, tracking is available by specifying a person attempting to obtain the image registered in the memory through an external device for forgery purposes, and the location where the forgery would take place.

Further, as discussed, a preferable embodiment of the present invention has an arrangement in which, in the case where an external device sends a request for retrieving image data which is judged to be of a specific document and therefore erased from the memory, the identification number (fax number, for example) of the external device is stored, and any future call from this external device is not received.

It is thus possible to prevent not only the current forgery but also future forgery by the external device.

[Second Embodiment]

The following will explain another embodiment of the present invention with reference to FIGS. 3 to 8. For ease of explanation, members having the same functions as those shown in the drawings pertaining to the First Embodiment above will be given the same reference symbols.

Figure 8:
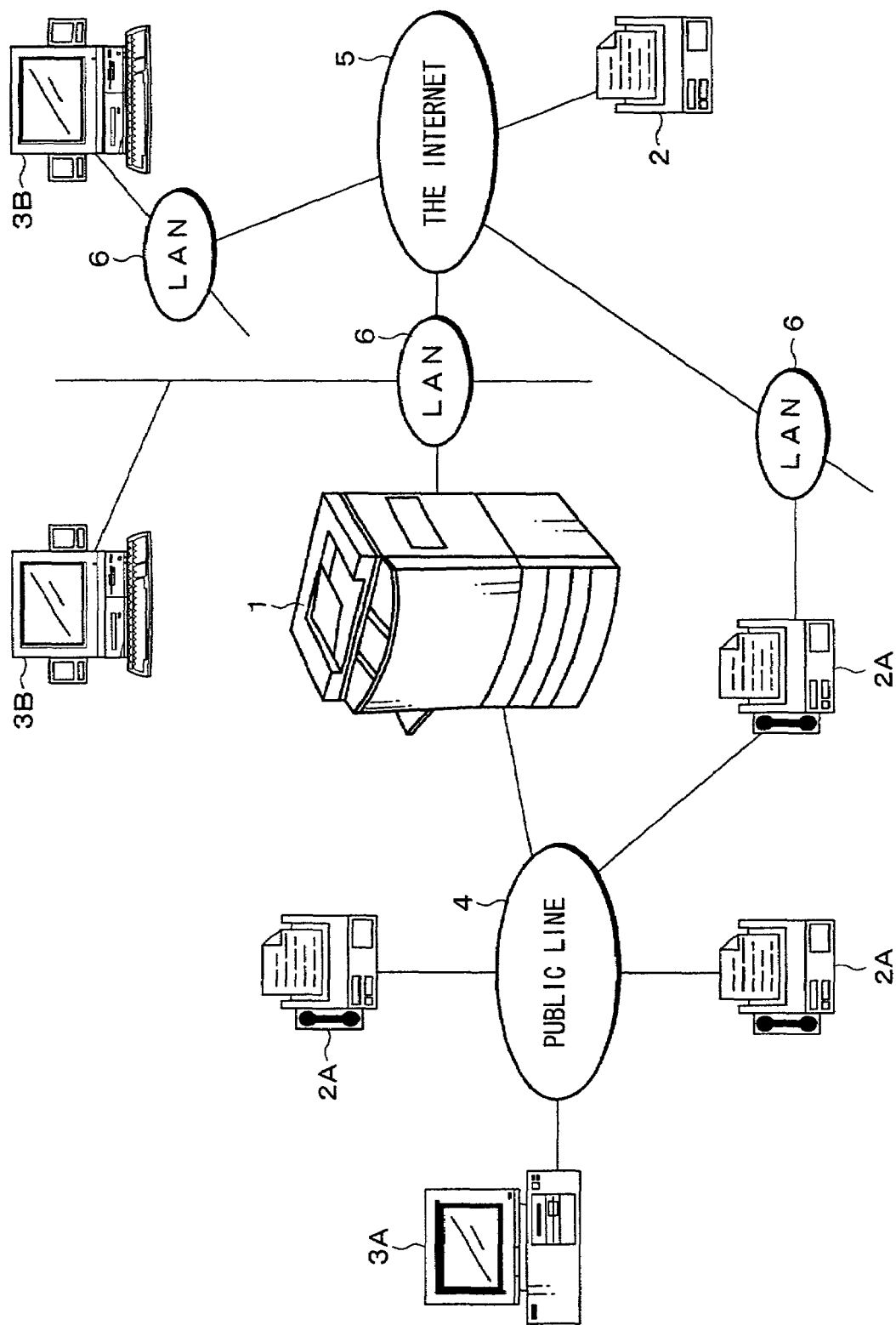
FIG. 8 is an explanatory view showing an example of a network connection involving a digital image forming device of FIG. 7.

As shown in FIG. 8, the digital image forming device 1 as an image transmission device according to one embodiment of the present invention is a digital combined machine provided with a copy mode, a facsimile (fax) mode, a printer mode, and the like (a digital combined machine provided with the facsimile mode), and is also a device over a computer network, which is connected to external devices, such as facsimiles 2A and 2B and computers 3A and 3B including a personal computer, via such communications network as a public line (telephone line) 4, the Internet 5 and a LAN (Local Area Network) 6.

In an example of FIG. 8, the digital image forming device 1 is connected via the public line 4 to three facsimiles 2A and a single computer 3A having a fax modem, and is further connected via the Internet 5 and the LAN 6 to one each of the facsimile 2B and computer 3B, each of which is provided with a network mode (i.e., the mode to enable data communication with external devices via a computer network). Further, one of the three facsimiles 2A is provided with the network mode and is connected to the digital image forming device 1 also via the LAN 6 and the Internet 5. Furthermore, the digital image forming device 1 is connected via the LAN 6 to the single computer 3B having the network mode.

FIG. 7 is a block diagram schematically showing a configuration of a digital image forming device 1 according to the present embodiment. As shown in FIG. 7, the digital image forming device 1 according to the present embodiment is provided with a facsimile polling transmission mode, that is, the mode to receive via the public line 4 a transmission request (polling transmission request) from the facsimile (an external device, an external image receiving device) 2A so as to transmit image data via the public line 4 to the facsimile 2A in response to the transmission request.

The digital image forming device 1 includes an image scanner 11, a control panel 12, a printer 13, a fax sending/receiving section (image transmitting section) 14 for sending and receiving a fax via the public line 4, an electronic mail (e-mail) sending/receiving section 15, a written warning creating section 24 (warning means), a control section (transmission control section, call refusing means) 16 for controlling all of these, and others.

The control panel 12 is provided to enable a user to make various settings for different modes (a copy mode, a fax mode, a printer mode, etc.), such as setting image quality upon fax transmission, inputting a destination of transmission, registering image data for polling transmission use, and the like. The operation of the control panel 12 is controlled by the control section 16 through the panel control section 17. Further, though not shown, the control panel 12 includes a display for displaying various setting details inputted through the control panel 12. Note that, the setting details inputted through the control panel 12 are displayed in the display while being stored in a second memory 18.

The image scanner 11 includes a scanning section (image scanning section) 19 for generating image data of a scanned document, and a first memory (image storage section) 20 for storing (accumulating) the image data generated at the scanning section 19. In the first memory 20 are provided a plurality of memory boxes (storage regions) which are not shown and set to register (store) the image data of mutually different document. The external facsimile 2A is set to transmit a request (request for retrieval), such as "send (retrieve) the image data registered in a specified memory box", to the digital image forming device 1 via the public line 4. In the case where the request for retrieval of the image data registered in the memory box (a polling transmission request) is transmitted from the external facsimile 2A to the digital image forming device 1, the fax sending/receiving section 14, under the control of the control section 16, transmits the image data registered in the memory box via the public line 4 to the facsimile 2A requesting the polling transmission.

Further, the image scanner 11 is provided with a third memory 21 in which sample data of one or more specific document is stored in advance, a specific document judging section (specific image judging section) 22 for judging whether or not the scanned document is a specific document, and a fourth memory (a specific image information storage section, a transmission request sender information storage section) 23 for storing information that a specific document is registered.

The specific document judging section 22 judges whether or not the scanned document is a specific document by making a comparison between the document image data stored in the first memory 20 and the sample data of one or more specific document stored in advance in the third memory 21. Note that, operational processes in the judgment of a specific document by the specific document judging section 22 of the image scanner 11 will be explained in detail later.

Meanwhile, when scanning a document, the fourth memory 23 stores, in each memory box, information of whether or not an activity of registering a specific document ("specific document register activity", hereinafter; forgery) has been executed (information of the "presence or absence of the specific document register activity") by using each memory box (according to the number attached to each memory box). Further, when a polling transmission request is sent to a memory box indicating the "presence of the a specific document register activity", the fourth memory 23 further stores transmission request sender information, such as the fax number of the facsimile 2A requesting the polling transmission (destination fax number) and the like, and information on the image data registered in the memory box indicating the "presence of the specific document register activity" (specific image information) in each memory box.

The printer 13, when a mode is either of copy, fax or printer, outputs an image onto such a recording material as paper or the like based on the document image data stored in the first memory 20. Further, the e-mail sending/receiving section 15 performs sending/ receiving of an e-mail via such computer networks as the Internet 5, the LAN 6 and the like.

The written warning creating section 24, when a polling transmission request is sent to a memory box which was used for forgery (a memory box indicating the "presence of the specific document register activity"), creates a document of warning with respect to the facsimile 2A requesting the polling transmission.

FIG. 3 indicates communication steps between a facsimile requesting the polling transmission (here, the external facsimile 2A which attempts to retrieve the document image data stored in the first memory 20 of the digital image forming device 1 so as to output the retrieved document image data) and a facsimile to perform the polling transmission (here, the digital image forming device 1), in the case of the facsimile polling transmission.

When performing the facsimile polling transmission, communication is made, where the facsimile requesting the polling transmission (hereinafter referred to as "polling request side device") is a calling station, and the facsimile to perform the polling transmission (hereinafter referred to as "polling transmission side device") is a called station. As shown in FIG. 3, first of all, the polling request side device transmits a CNG signal (calling tone) indicating that the polling request side device (calling station) is a facsimile (non-voice terminal). Next, in response to the ONG signal, the polling transmission side device transmits a CED (Called Station Identification) signal indicating that the polling transmission side device (called station) is a facsimile.

Thereafter, the polling transmission side device transmits a NSF (Non-Standard Facilities) signal indicating an original facility (non-standard facilities: a confidential communication mode, a relay mode, etc.) of a home device (polling transmission side device) in the mutual communication with the polling request side device. Further, the polling transmission side device transmits the following signals to the polling request side device: a CSI (Called Subscriber Identification) signal indicating the phone number (20 digits maximum) of the polling transmission side device (called station); and a DIS (Digital Identification Signal) for notifying the polling request side device of receiving performance (data transmission speed, resolution, a maximum receiving bandwidth, etc.) of the home device (polling transmission side device).

Corresponding to the transmission of the NSF, CSI, DIS signals by the polling transmission side device, the polling request side device, in order to show that a polling request is to be made, transmits the following signals to the polling transmission side device: a NSC (Non-Standard Facilities Command) signal indicating an original facility (a confidential communication mode, a relay mode, etc.) of a home device (polling request side device) in the mutual communication, a CIG (Calling Subscriber Identification) signal indicating the phone number (20 digits maximum) of the polling request side device (calling station), and a DTC (Digital Transmit Command) signal for notifying the polling transmission side device of receiving performance (data transmission speed, resolution, a maximum receiving bandwidth, etc.) of the home device (polling request side device) when the right to transmit a message is assigned to a receiving station.

In the polling communication, as discussed, the polling request side device declares, by transmitting the NSC, CIG and DTC signals, that the polling communication is to be carried out.

Corresponding to the transmission of the NSC, CIG and DTC signals by the polling request side device, the polling transmission side device transmits the following signals to the polling request side device: an NSS (Non-Standard Facilities Set-up) signal indicating the setting of its own modes (a confidential communication mode, a relay mode, etc.); a TSI (Transmitting Subscriber Identification) signal indicating the phone number (20 digits maximum) of the polling transmission side device; and a DCS (Digital Transmit Command) signal for notifying the polling request side device of the setting of receiving performance (data transmission speed, resolution, a maximum receiving bandwidth, etc.) of the home device (polling transmission side device).

As explained, after transmitting information of home devices, such as the non-standard facility signal, the phone number and the performance signal, between the sending end (polling transmission side device) and the receiving end (polling request side device), a Tr signal (training signal) and a TCF (Training Check) signal are transmitted from the polling transmission side device to the polling request side device for training purposes. Based on the transmission speed of these signals, it is checked whether or not the line is ready for use. When training terminates under a normal condition, and it is checked that the line is ready for use, a CFR (Confirmation to Receive) signal indicating that the preparation for receiving is done (ready to receive, OK) is transmitted from the polling request side device to the polling transmission side device.

Thereafter, an MSG signal which is an image data signal is transmitted from the polling transmission side device to the polling request side device. In that case, for a further check, a Tr signal is attached to the front of the MSG signal to be transmitted. Then, when the transmission of image data signals corresponding to one page terminates, an EOP (End of Procedure) signal which is an "end of page" signal is transmitted from the polling transmission side device to the polling request side device. In response to this, the polling request side device transmits an MCF (Message Confirmation) signal indicative of the proper receipt of the image data signal (receiving is OK) to the polling transmission side device.

In the case where there is image data corresponding to a next page, the transmission and receipt of an MSG signal is repeated. In the case where there is no more image data to be transmitted, the polling transmission side device transmits a DCN (Disconnect) signal indicative of the termination of data transmission and the disconnection of the line to the polling request side device, thereby terminating a series of facsimile polling communications.

Next, the following will explain an operational process in the case where there is the specific document register activity by the image scanner 11 and an operational process in the case where a retrieval request is made with respect to a memory box subject to the specific document register activity, with reference to the flow charts of FIGS. 4 and 5. Note that, here, a forgery prevention treatment in the case of faxing an image corresponding to a sheet of document will be explained.

First, a user sets an original document for transmission at the scanning section 19 (S101) and inputs the number of a memory box, in which the image data of the document thus set is to be registered, through the control panel 12 (S102), thereby storing the number of the register-destination memory box in the second memory 18. In the present example, the number of the register-destination memory box is set by the 2-digit number, such as "00", "01", "02" and the like.

Next, the user operates the control panel 12 so as to set image quality and density according to a type of the document for transmission thus set, such as an image type (a photograph, letters, etc.) and the size and density of the letters (S103). As with the foregoing, the setting of image quality and density is also stored in the second memory 18.

Here, the image quality refers to scanning resolution by the scanning section (scanner) 19, which includes the following four modes as shown in FIG. 6: "normal letters"; "small letters"; "fine"; and "high definition". Note that, details and scanning resolution of each mode are indicated in FIG. 6. In addition, the density includes the following three modes: "automatic"; "thick"; and "thin". The image quality and density can be arbitrarily selected from these modes and set by the user. An example of the setting is as follows: the image quality is set on "high definition" (the scanning resolution is 400 dpi [dots per inch]×400 dpi), and the density is set on "automatic".

After finishing setting the document for register in step S103, the user presses a register start key of the control panel 12 (S104), thereby performing pre-scanning for judging whether or not the document set at the scanning section 19 is a specific document (S105). The pre-scanning is performed with the predetermined image quality and density regardless of what image quality and density are set by the user. The document image data pre-scanned in step S105 is registered (stored) in the first memory (image memory) 20 as an image storage section (S106). Next, the specific document judging section 22 makes comparison between the image data of the registered document stored in the first memory 20 and the sample data of one or more specific document stored in the third memory 21, thereby judging whether the registered document is a specific document (S107).

The specific document includes those, copying of which is strictly prohibited, such as paper money, valuable securities, seals, official documents, and season tickets and commutation tickets of various transportation means; and those, copying of which should be restricted, such as secret documents, copyright works (paintings, photographs, etc.). In step S107, when all or part of the data of the registered document stored in the first memory 20 resembles the image data of the specific documents above, it is judged that the registered document is a specific document.

As a result of the judgment in step S107, when it is judged that the registered document is not a specific document, the scanning section 19 scans the document set at the scanning section 19 with the image quality and density set by the user in step S103 (for example, the image quality: "high definition"; and the density: "automatic") (S108), thereby storing the image data of the registered document in a memory box (designated memory box) on the first memory 20, the number of which corresponds to that of a memory box inputted in step S102 (s109).

On the other hand, when it is judged that the registered document is a specific document, the storage content of the memory box corresponding to the memory box number inputted in step S102, i.e., the image data of the registered document is erased (cleared). At the same time, in step Sill, as information indicative of the presence or absence of the specific document register activity (forgery) in the memory box corresponding to the memory box number inputted in step S102, such information as information on the image data of the registered document stored in the memory box is stored in the fourth memory 23. Note that, in an example of FIG. 7, a specific document is a document registered in a memory box corresponding to the memory box number "01", and a document registered in a memory box corresponding to the memory box number "02" is not a specific document.

Note that, explanation referring to FIG. 4 has been made through the case where image data corresponding to a sheet of document is transmitted in response to a request from the outside. However, it is also possible to transmit image data corresponding to two or more sheets of document. In that case, the process of FIG. 4 may be repeated for each sheet of document. Alternatively, it is also possible that the image register processes of S101 to S106 are collectively performed with respect to two or more sheets of document, thereafter performing the processes of S107 to S111 for each sheet of document. Further, in the former method, in the case where part of the two or more sheets of document includes a specific document, only the transmission of the image data of the specific document is prohibited. In the latter method, in the case where part of the two or more sheets of document includes a specific document, only the transmission of the image data of the specific document may be prohibited, or the transmission of the image data of all documents including the image data of the specific document may be prohibited.

Next, the following will explain an operational process in the case where a retrieval request (polling transmission request) is sent from a different facsimile 2A when there is the specific document register activity in the memory box on the first memory 20.

When a call is received from the different facsimile 2A (S201), by judging whether the CNG signal comes or not, it is judged whether the call is of the facsimile communications or the voice call (voice communications) (S202). As a result of the judgment in step S202, if it is not of the facsimile communications, it is judged that the call is of the voice communications, thereby starting the voice communications (S206).

On the other hand, as a result of the judgment in step S202, if the call is of the facsimile communications, it is judged whether it is a request for retrieving image data (polling transmission request) (S203), and if not, a normal facsimile receiving process is performed (S207).

As a result of the judgment in step S203, if it is the polling transmission request, it is judged whether the memory box number of the polling transmission request is identical with the memory box number subject to the specific document register activity, based on information indicative of the presence or absence of the specific document register activity (forgery) that is stored in the fourth memory 23 (S204). Consequently, when the memory box number of the polling transmission request is different from the memory box number subject to the specific document register activity, the image data registered in the memory box corresponding to the memory box number of the polling transmission request is transmitted to the polling transmission request side (polling request side) facsimile 2A (S205).

On the other hand, as a result of judgment in step S204, it is judged that the number of the memory box of the polling transmission request is identical with that subject to the specific document register activity, the fax number of the polling request side (calling station) device that is included in the CIG signal, "12–3456" for example, is stored in the fourth memory 23 (S208) Thereafter, the printer 13 is used to print out a record of the call received indicating that the polling transmission request was sent to the memory box corresponding to the above memory box number (S209). At the same time, a written warning against forgery is created at the written warning creating section 24, and the image data of the written warning thus created is stored as image data for transmission in the memory box corresponding to the above memory box number (S210). The image data of the written warning is transmitted to the polling transmission request side (polling request side) facsimile 2A (S205). Note that, step S209 may be omitted.

As discussed, the digital image forming device 1 according to the present embodiment has an arrangement in which, when it is judged that the document image data generated at the scanning section 19 and registered in a memory box is the image data of a specific document, the registered image data of the registered document in the memory box is erased, thereby storing only the information indicating that there was the specific document register activity. Therefore, in the digital image forming device 1, even when a request for the polling transmission of the registered document is sent from the external facsimile 2A, if the registered document is a specific document, the transmission of the registered document image data to the polling request side facsimile 2A is prohibited. Accordingly, an output device (printer) of the polling request side facsimile 2A, an image of a specific document cannot be outputted (printed out), thereby preventing the forgery of a specific document by the polling transmission of the specific document image data to the facsimile 2A.

Moreover, in the digital image forming device 1 according to the present embodiment, when receiving a request for the polling transmission of a specific document, the fax number of the polling request side device is stored, thereby making it possible to specify the facsimile 2A that attempted to commit forgery of a specific document. Consequently, it is possible to specify at which facsimile 2A an attempt of forging a specific document was made and track the activities of forgery.

Note that, in the case where the memory box to which the polling request was sent is the memory box subject to the specific document register activity, it is possible to store the identification number (the fax number, for example) of the external facsimile 2A (polling request side facsimile 2A) from which a request (transmission request) for retrieving an image registered in the memory was sent, while arranging the control section 16 to be provided with a mode to prevent a future call from the external facsimile 2A having this identification number. In that case, forgery by this external facsimile 2A can surely be prevented hereafter, including the forgery prevented this time.

Incidentally, an explanation has been made through the case where, in polling transmission in response to a transmission request from the facsimile 2A, the transmission of a specific document image to the facsimile 2A is prevented. However, with the digital image forming device 1 according to the present embodiment, it is also possible that polling transmission with respect to another external device provided with a facsimile mode (for example, a computer 3A provided with a fax modem) is performed in response to a transmission request from that external device. In that case, as with the foregoing, the transmission of a specific document image to the external device can be prevented.

[Third Embodiment]

Figure 9:
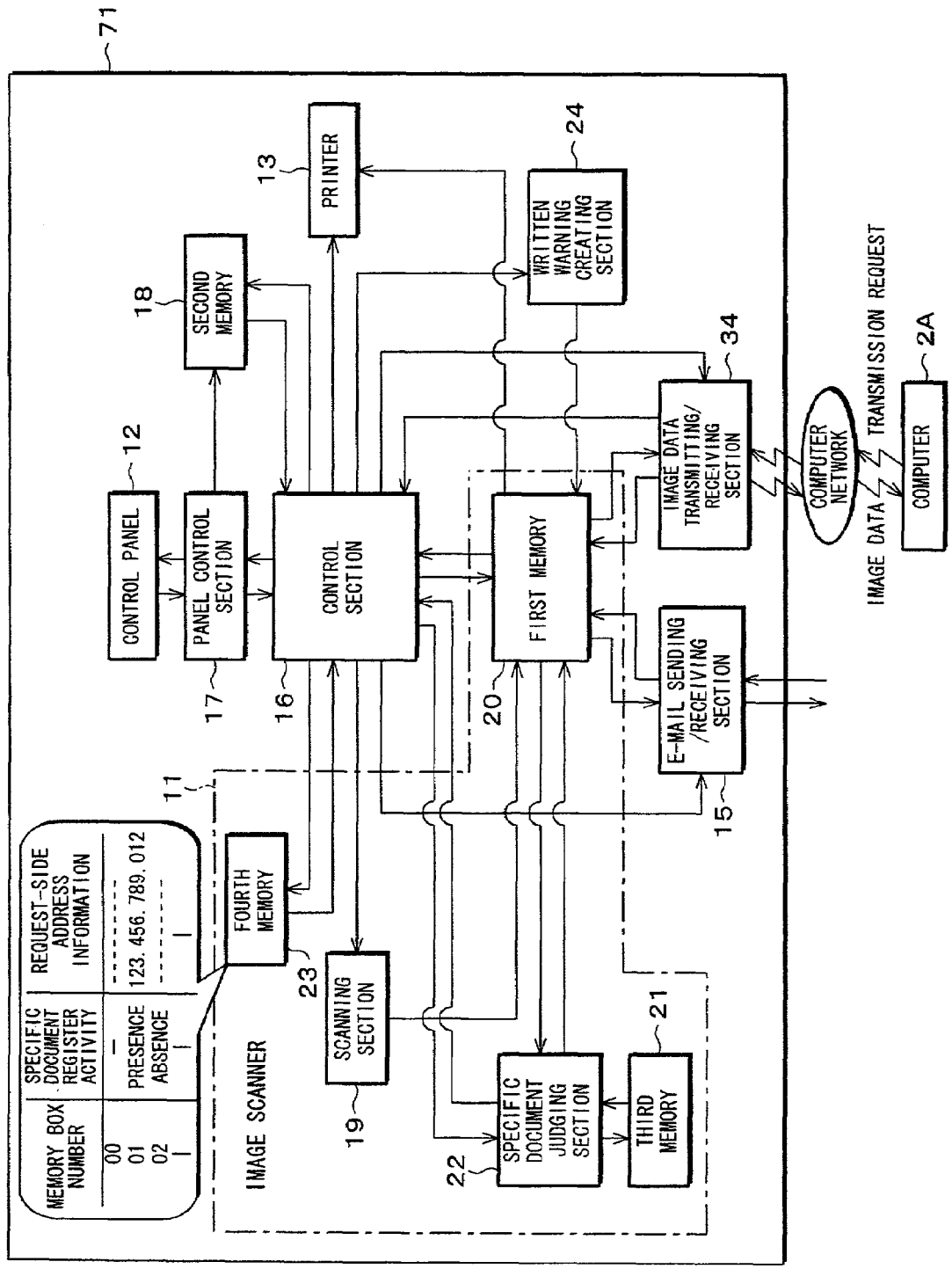
FIG. 9 is a block diagram showing a configuration of a digital image forming device as an image transmission device according to still another embodiment of the present invention.
Figure 10:
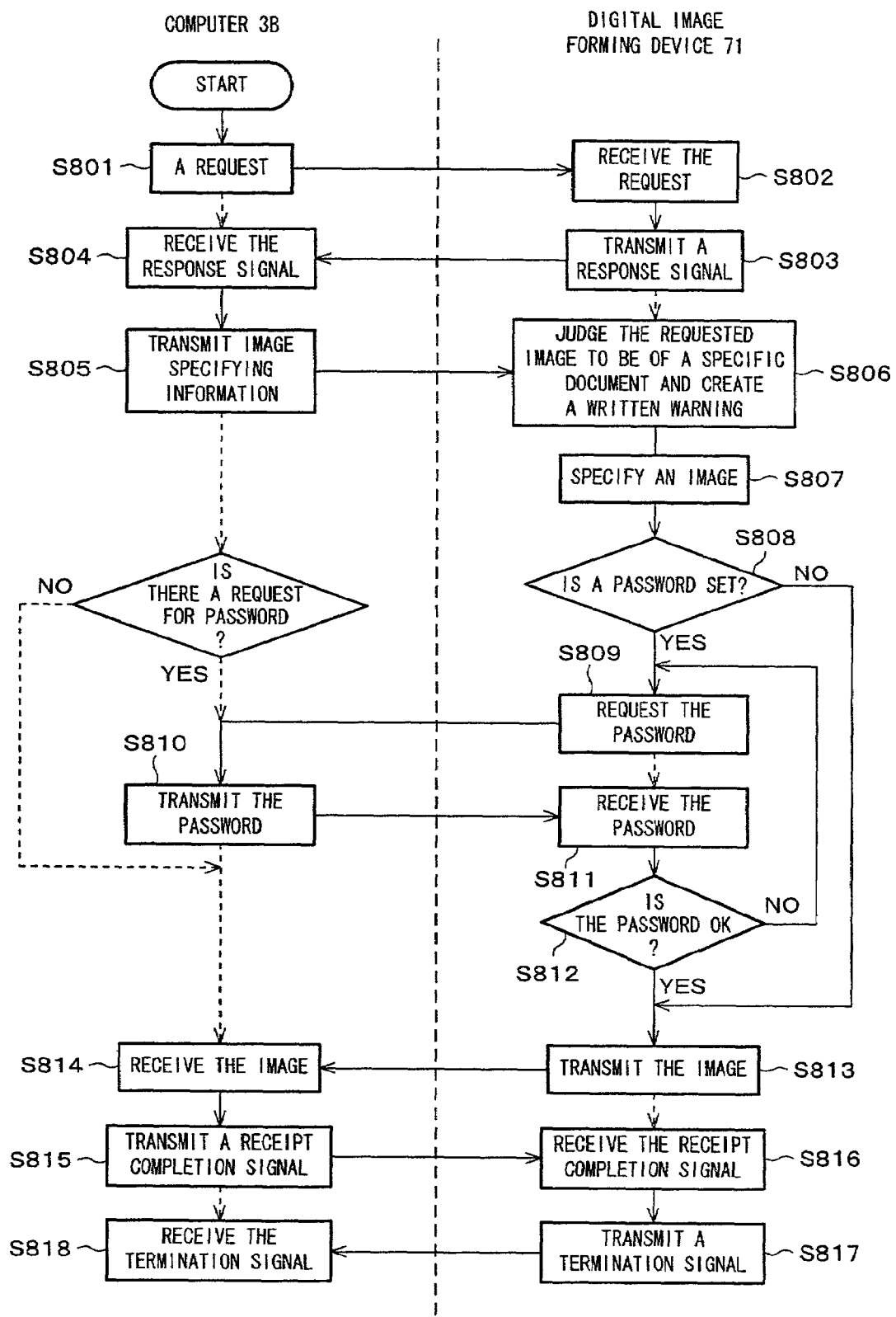
FIG. 10 is an explanatory view showing an example of a procedure for communications between the digital image forming device of FIG. 7 and an external terminal.
Figure 11:
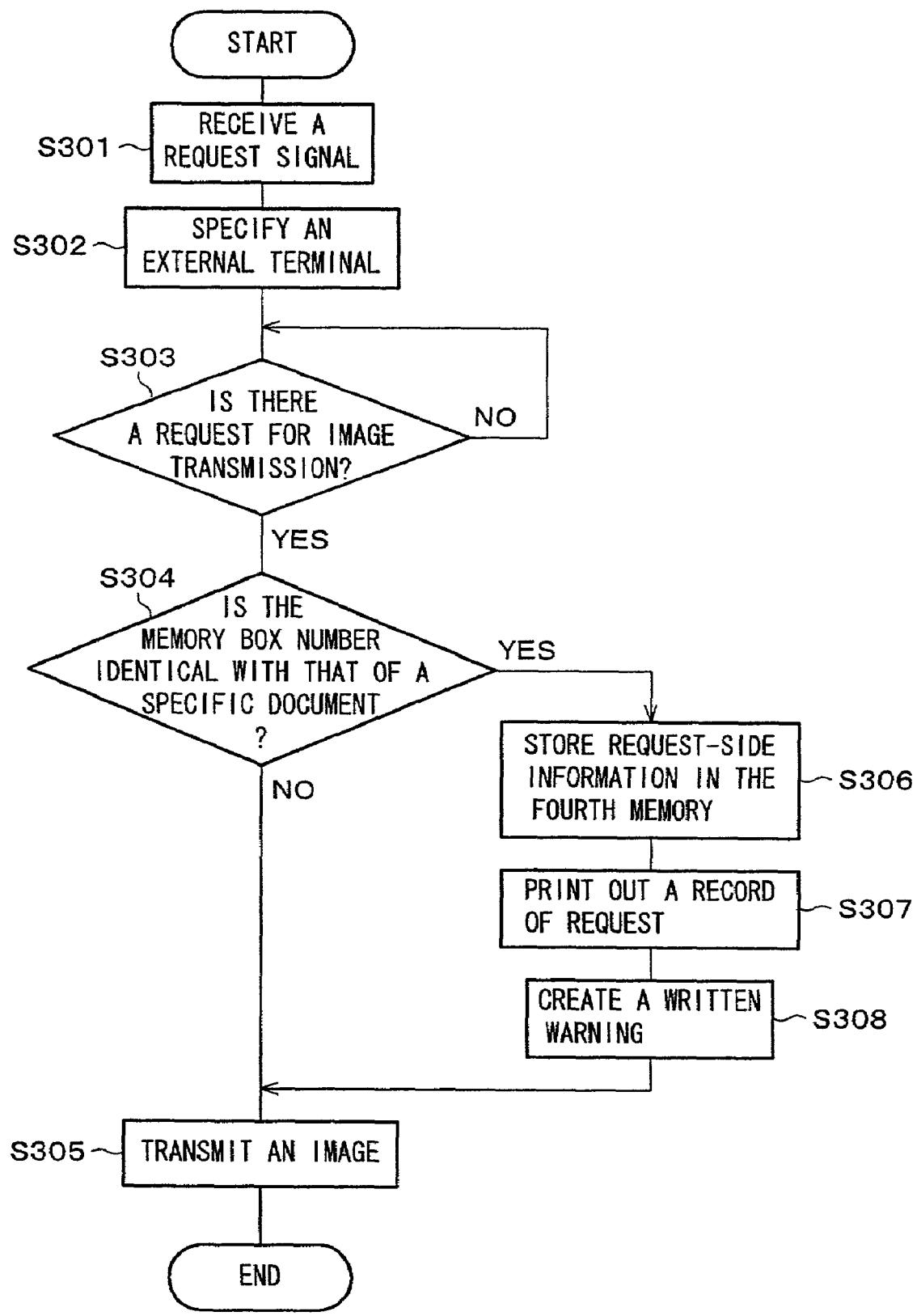
FIG. 11 is a flow chart showing the flow of processes in the case where a request for retrieving image data is sent to a memory box subject to a specific document register activity in the digital image forming device of FIG. 7.

The following will describe an image transmission device according to still another embodiment of the present invention with reference to FIGS. 9 to 11. The image transmission device according to the present embodiment is applied to a digital image forming device (a digital combined machine provided with a network scanner mode) which is provided with a scanner mode and a facsimile transmission mode and also capable of the transmission of image data in accordance with a request for image data transmission which is received from such external terminal computers as a computer 3B provided with a network mode (hereinafter simply referred to as "external terminal") and the like via computer networks, such as the Internet 5, a LAN 6, and others. FIG. 9 is a block diagram schematically showing the configuration of the digital image forming device. Note that, for ease of explanation, members having the same functions as those shown in the drawings pertaining to the First or Second Embodiment above will be given the same reference symbols, and explanation thereof will be omitted.

As shown in FIG. 9, a digital image forming device according to the present embodiment has the same arrangement as with the digital image forming device 1 above except for a point that the fax sending/receiving section 14 of the digital image forming device 1 is replaced with an image data transmitting/receiving section (image transmitting section) 34 for transmitting/receiving image data via the Internet 5 and the LAN 6. More specifically, the digital image forming device 71 includes an image scanner 11, a control panel 12, a printer 13, an image data transmitting/ receiving section 34, an e-mail sending/receiving section 15, a written warning creating section 24, a control section 16 controlling all of these, and others. In addition, though not shown, the digital image forming device 71, as with the digital image forming device 1 of FIG. 8, is connected to a facsimile 2A and a computer 3A provided with a fax modem via a public line 4 while being connected to a facsimile 2B and a computer 3B both of which are provided with a network mode via the Internet 5 and the LAN 6.

The control panel 12 is operated by a user to input various settings for different modes (a copy mode, a fax mode, a printer mode, a network scanner mode, etc.), such as image quality settings upon image transmission in the fax mode, details of the destination of transmission, and the like. The operation of the control panel 12 is controlled by the control section 16 through a panel control section 17. In addition, though not shown, the control panel 12 has a display thereon to display the details of various settings inputted through the control panel 12. Note that, the details of settings thus inputted through the control panel 12 are displayed on the display while being stored in a second memory 18.

The image scanner 11 includes a scanning section 19 for scanning an image of a document and generating image data of the scanned document, and a first memory 20 for storing the image data generated at the scanning section 19. In the first memory 20 are provided a plurality of memory boxes (storage regions) which are not shown and set to register mutually different document image data. The computer 3B connected to the digital image forming device 71 via the Internet 5 and the LAN 6 is set to transmit a request (request for retrieval), such as "send the image data registered in a specified memory box", to the digital image forming device 71 via the Internet 5 and the LAN 6. In the case where the request for retrieval of the image data registered in the memory box (a polling transmission request) is transmitted from the external computer 3B to the digital image forming device 1, an image data transmitting/receiving section 34, under the control of the control section 16, transmits the image data registered in the memory box via the Internet 5 and the LAN 6 to the computer 3B requesting the transmission.

Further, the image scanner 11 is provided with a third memory 21 in which sample data of one or more specific document is stored in advance, a specific document judging section 22 for judging whether or not the scanned document is a specific document, and a fourth memory 23 for storing information that a specific document is registered.

The specific document judging section 22 judges whether or not the scanned document is a specific document by making a comparison between the document image data stored in the first memory 20 and the sample data of one or more specific document stored in advance in the third memory 21. Note that, operational processes in the judgment of a specific document by the image scanner 11 will be explained in detail later.

Meanwhile, the fourth memory 23, when scanning a document, stores, in each memory box, information of whether or not an activity of registering a specific document ("specific document register activity", hereinafter; forgery) has been executed (information of the "presence or absence of the specific document register activity") by using each memory box (according to the number attached to each memory box). Further, when a polling transmission request is sent to a memory box indicating the "presence of the a specific document register activity", the fourth memory 23 further stores transmission request sender information, such as the fax number of the facsimile 2A requesting the polling transmission (destination fax number) and the like, and information on the image data registered in the memory box indicating the "presence of the specific document register activity" (specific image information) in each memory box.

The printer 13, when a mode is either of copy, fax or printer, outputs an image based on the document image data stored in the first memory 20.

The written warning creating section 24, when a polling transmission request is sent to a memory box which was used for forgery (a memory box indicating the "presence of the specific document register activity"), creates a document of warning with respect to the facsimile 2A requesting the polling transmission.

FIG. 10 indicates communications processes performed when a transmission request is sent from the computer 3B (external terminal) over the network to the digital image forming device 71 in accordance with the flow of the respective operation of the computer 3B and the digital image forming device 71. As shown in FIG. 10, first of all, the computer 3B which is a transmission request side device requests communications to the digital image forming device 71 (S801). More specifically, the computer 3B transmits such signals as a request signal (request start signal) for declaring that communications with regard to the transmission request are started, an identification signal of the computer 3B, and the like. In response to these signals, the digital image forming device 71 accepts the communications request (S802), specifies the computer 3B based on its identification signal, and sends (transmits) a response signal (preparation completion signal) to the computer 3B (S803).

In response to this, the transmission request side computer 3B transmits image specifying information for specifying the image data to be transmitted, for example, information on the number of a memory box storing the image data, selected from all the image data stored in, and managed by, the digital image forming device 71, and requests transmission of image data corresponding to that information (S805). On the other hand, after performing a process of judging a specific document and creating a written warning based on the image specifying information (S806), the digital image forming device 71 moves on to a process of image transmission for transmitting the image data to the computer 3B (S807 to S818). The process of judging a specific document and creating a written warning will be discussed later.

In the process of image transmission, first of all, the digital image forming device 71 specifies (confirms) the image data whose transmission is requested based on the image specifying information and the like (S807) Thereafter, the digital image forming device 71, based on password setting information included in the image data specified in step S806, judges whether or not a password for security purposes is set on the image data (S808). On one hand, if the password is not set, the digital image forming device 71 sends (transmits) the image data to the computer 3B (S813). On the other hand, if the password is set, the digital image forming device 71 carries out password confirming steps S808 to S812 and, upon confirmation of the password (S812), transmits the image data to the computer 3B (S813).

At the password confirming step, first of all, the digital image forming device 71 sends a request for password to the computer 3B (S809). In response to this, the computer 3B request a user to input the password. When the user inputs the password, the computer 3B sends the inputted password to the digital image forming device 71 (S810). Note that, as shown in FIG. 10 with the broken line, in the absence of the request for password, the computer 3B does not send the password, and the sequence goes to S814 to be discussed later. When the password is transmitted, the digital image forming device 71 receives the password (S811) so as to check if the password is correct (OK) (S812). When the password is correct, the digital image forming device 71 sends the image data to the computer 3B (S813). However, if the password is not correct, the sequence goes to step S809, and the correct password is requested again.

When the image data is thus sent from the digital image forming device 71, the image data is received by the computer 3B (S814). When sending/receiving of the image data between the computer 3B and the digital image forming device 71 is completed, in order to check each other the completion of the sending/receiving of the image data between the computer 3B and the digital image forming device 71, a signal indicative of the completion of sending/receiving is exchanged. More specifically, when the sending/receiving of the image data is completed, first of all, a receipt completion signal indicating that the receipt of image data is completed is sent from the computer 3B (S815), that is received by the digital image forming device 71 (S816). Next, the digital image forming device 71 sends a termination signal indicating that the process of image data transmission is terminated (S817), that is received by the computer 3B (S818), thereby finishing the process of sending/receiving image data according to the request for image data transmission.

The operational processes in the case where there is a specific document register activity by the image scanner 11 and in the case where a retrieval request is sent to a memory box are basically the same as those of the Second Embodiment above, and the processes are performed in the flow that is indicated by the flow charts of FIGS. 4 and 11.

More specifically, a user sets an original document for transmission at the scanning section 19 (S101) and inputs the number of a memory box, in which the image data of the document thus set is to be registered, through the control panel 12 (S102), thereby storing the number of the register-destination memory box in the second memory 18. In the present example, the number of the register-destination memory box is set by the 2-digit number, such as "00", "01", "02" and the like.

Next, the user operates the control panel 12 so as to set image quality and density according to a type of the document for transmission thus set, such as an image type (a photograph, letters, etc.) and the size and density of the letters (S103). As with the foregoing, the setting of image quality and density is also stored in the second memory 18.

Here, the image quality refers to scanning resolution by the scanning section (scanner) 19, which includes the following four modes as shown in FIG. 6: "normal letters"; "small letters"; "fine"; and "high definition". Note that, details and scanning resolution of each mode are indicated in FIG. 6. In addition, the density includes the following three modes: "automatic"; "thick"; and "thin". The image quality and density can be arbitrarily selected from these modes and set by the user. An example of the setting is as follows: the image quality is set on "high definition" (the scanning resolution is 400 dpi [dots per inch]×400 dpi), and the density is set on "automatic".

After finishing setting the document for register in step S103, the user presses a register start key of the control panel 12 (S104), thereby performing pre-scanning for judging whether or not the document set at the scanning section 19 is a specific document (S105). The pre-scanning is performed with the predetermined image quality and density regardless of what image quality and density are set by the user. The document image data pre-scanned in step S105 is registered (stored) in the first memory (image memory) 20 as an image storage section (S106). Next, the specific document judging section 22 makes comparison between the image data of the registered document stored in the first memory 20 and the sample data of one or more specific document stored in the third memory 21, thereby judging whether the registered document is a specific document (S107).

As a result of the judgment in step S107, when it is judged that the registered document is not a specific document, the scanning section 19 scans the document set at the scanning section 19 with the image quality and density set by the user in step S103 (for example, the image quality: "high definition"; and the density: "automatic") (S108), thereby storing the image data of the registered document in a memory box (designated memory box) on the first memory 20, the number of which corresponds to that of a memory box inputted in step S102 (S109).

On the other hand, when it is judged that the registered document is a specific document, the storage content of the memory box corresponding to the memory box number inputted in step S102, i.e., the image data of the registered document is erased (cleared). At the same time, in step Sill, as information indicative of the presence or absence of the specific document register activity (forgery) in the memory box corresponding to the memory box number inputted in step S102, such information as information on the image data of the registered document stored in the memory box is stored in the fourth memory 23. Note that, in an example of FIG. 9, a specific document is a document registered in a memory box corresponding to the memory box number "01", and a document registered in a memory box corresponding to the memory box number "02" is not a specific document.

Note that, explanation referring to FIG. 4 has been made through the case where image data corresponding to a sheet of document is transmitted in response to a request from the outside. However, it is also possible to transmit image data corresponding to two or more sheets of document. In that case, the process of FIG. 4 may be repeated for each sheet of document. Alternatively, it is also possible that the image register processes of S101 to S106 are collectively performed with respect to two or more sheets of document, thereafter performing the processes of S107 to S111 for each sheet of document. Further, in the former method, in the case where part of the two or more sheets of document includes a specific document, only the transmission of the image data of the specific document is prohibited. In the latter method, in the case where part of the two or more sheets of document includes a specific document, only the transmission of the image data of the specific document may be prohibited, or the transmission of the image data of all documents including the image data of the specific document may be prohibited.

Next, the following will explain operational processes of the digital image forming device 71 in the case where the computer 3B sends a retrieval request to a memory box subject to the specific document register activity with reference to FIG. 11.

First, when the computer 3B sends a communications request (S801 of FIG. 10), then as shown in FIG. 11, such signals as a request signal, an identification signal (information) of the computer 3B, and the like sent from the computer 3B are received (S301, S802 of FIG. 10). Then, based on the identification signal (information) of the computer 3B is specified the computer 3B (external terminal) (S302). As a result of the process of S302, when the computer 3B is specified, that computer 3B is set (managed) as the destination of image data, and a response signal is sent to the computer 3B (S803 of FIG. 10).

Thereafter, the digital image forming device 71 is put on standby until it receives a request for image data transmission (S805 of FIG. 10) from the computer 3B (S303). In the standby state, when the request for image data transmission is sent from the computer 3B, the sequence goes to steps S304 to S307 of the process of judging a specific document and creating a written warning (S806 of FIG. 10).

In the process of judging a specific document and creating a written warning, first of all, it is judged whether the number of the memory box to which a transmission request is sent is identical with that of the memory box subject to the specific document register activity (S304). When the number of the memory box to which the transmission request was sent is other than that of the memory box subject to the specific document register activity, the sequence goes to a process of image transmission shown in S807 to S819 of FIG. 10, and image data registered in the memory box to which the transmission request was sent is transmitted to the transmission request side computer 3B (S305).

On the other hand, as a result of judgment in step S304, when the number of the memory box is identical with that of the memory box subject to the specific document register activity, address information (request side information; for example, when the LAN 6 adopts a TCP/IP protocol, an IP address represented in such a format as "123.456.789.012") of the computer 3B that requests the image data is stored in the fourth memory 23 (S306). Next, a record of receipt indicating that the transmission request was sent to the memory box subject to the specific document register activity is printed out (S307). At the same time, a written warning against forgery is created at the written warning creating section 24, and the written warning thus created is stored as image data for transmission in the memory box "01" (S308). Thereafter, the image data of the written warning is sent to the transmission request side computer 3B (S305). Note that, the step S307 may be omitted.

As discussed, the digital image forming device 71 according to the present embodiment has an arrangement in which, when it is judged that the document image data generated at the scanning section 19 and registered in a memory box is the image data of a specific document, the registered image data of the registered document in the memory box is erased, thereby storing only the information indicating that there was the specific document register activity. Therefore, in the digital image forming device 71, even when a request for the transmission of the registered document is sent from the external computer 3B, if the registered document is a specific document, the transmission of the registered document image data to the transmission request side computer 3B is prohibited. Accordingly, an output device (printer) of the transmission request side computer 3B, an image of a specific document cannot be outputted (printed out), thereby preventing the forgery of a specific document by the transmission of the specific document image data to the computer 3B.

Moreover, in the digital image forming device 71 according to the present embodiment, when receiving a request for the transmission of a specific document, the address information of the transmission request side computer 3B is stored, thereby making it possible to specify the computer 3B that attempted to commit forgery of a specific document. Consequently, it is possible to specify at which computer 3B an attempt of forging a specific document was made and track the activities of forgery.

Note that, in the case where the memory box to which the transmission request was sent is the memory box subject to the specific document register activity, it is possible to store the identification information (address information, for example) of the external computer 3B from which a request (transmission request) for retrieving an image registered in the memory box was sent, while arranging the control section 16 to be provided with a mode to prevent any future call from the external computer 3B having this identification information. In that case, forgery by this external computer 3B can surely be prevented hereafter, including the forgery prevented this time.

Incidentally, an explanation has been made through the case where, in the transmission in response to a transmission request from the computer 3B, the transmission of a specific document image to the computer 3B is prevented. However, with the digital image forming device 71 according to the present embodiment, it is also possible that transmission with respect to another external device provided with a network mode (for example, a facsimile 2A provided with the network mode) is performed in response to a transmission request from that external device. In that case, as with the foregoing, the transmission of a specific document image to the external device can be prevented.

Further, in the foregoing embodiments, by erasing the image data of a specific document at the time the document image data is registered, the transmission of the image data of the specific document is prohibited. However, it is also possible to prohibit or restrict the transmission of the image data of a specific document when transmitting the image data of the original document.

Further, in the case of thus prohibiting or restricting the transmission of the image data of a specific document when transmitting the image data of the original document, it is also possible to control the transmission of image data depending on a transmission request side device. It is possible, for example, that, in an environment having an image database established therein, the image database registering a plurality of images including images of specific documents whose information should be restricted when it is disclosed to some particular users, some information disclosure levels are set in advance for each transmission request side device, and the transmission (disclosure) of the image data of a specific document is controlled in accordance with an information disclosure level of the transmission request side device when the transmission of image data is requested. In addition, when thus controlling transmission in accordance with an information disclosure level of the transmission request side device, it is possible to previously classify terminals into two groups, one of which consists of terminals to which the transmission of the image data of a specific document is permitted, and the other consists of terminals to which the transmission of the image data of a specific document is prohibited.

[Fourth Embodiment]

In the Third Embodiment, the digital image forming device 71 that is provided with a network scanner mode and transmits the previously stored image data by request of the external computer 3B has been explained. Next, the following will describe as a Fourth Embodiment a digital image forming device which prepares image data in response to a transmission request from the external computer 3B and transmits the image data to the computer 3B that requested the transmission of the image data, with reference to FIG. 12. Note that, for ease of explanation, members having the same functions as those shown in the drawings pertaining to the First to Third Embodiments above will be given the same reference symbols, and explanation thereof will be omitted.

A digital image forming device according to the present embodiment, though not shown, is the same as the digital image forming device 71 except for a point that the control section 16 is provided with a function to receive a request for image data transmission from an external terminal, such as a computer 3B provided with a network mode, via such computer networks as the Internet 5, a LAN 6, and the like so as to generate the image data by activating the scanning section 19 in response to the transmission request and control the image data transmitting/receiving section 34 to transmit the image data thus generated.

The above transmission request is not like the one of the Third Embodiment that designates the number of a memory box which stores image data to be transmitted but to designate image quality and density for a scanning section 19.

Figure 12:
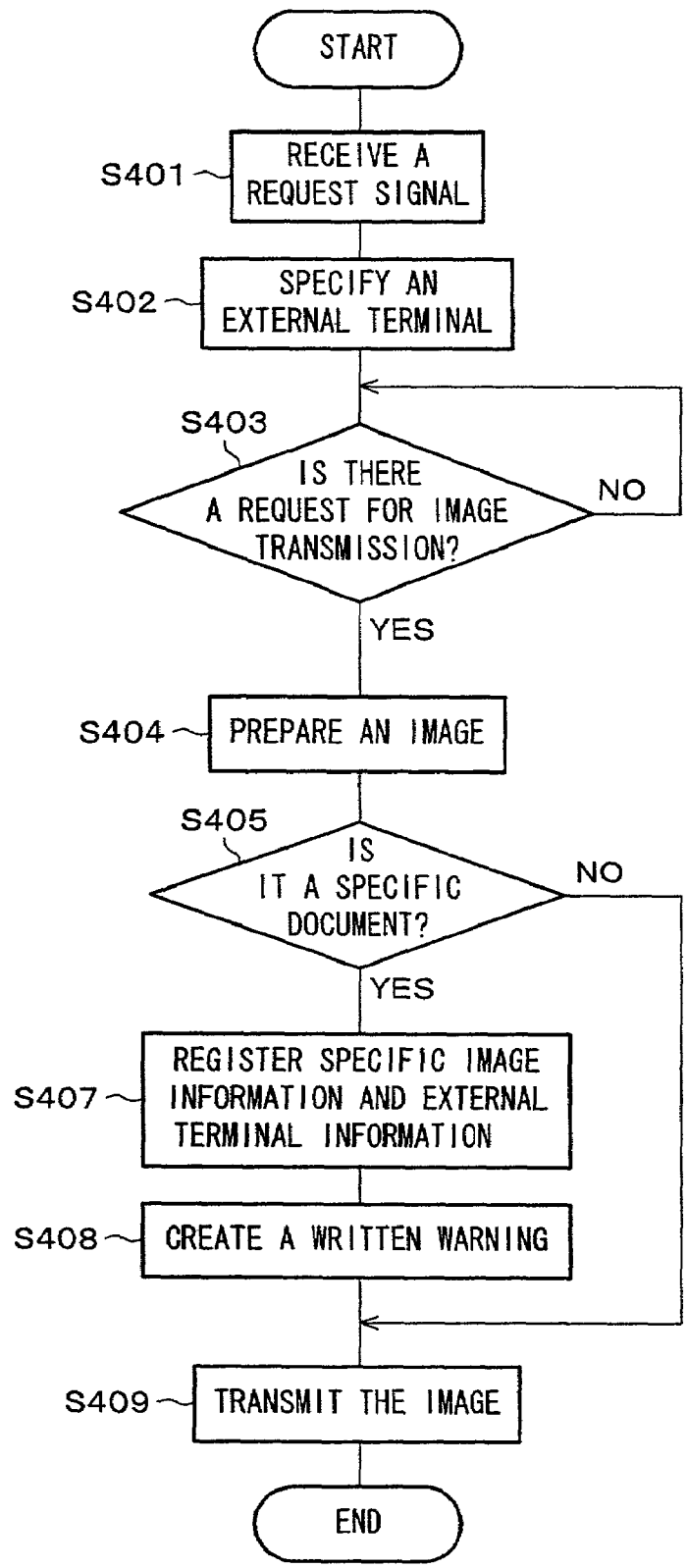
FIG. 12 is a flow chart showing the flow of processes in the case where image data prepared in response to a request for transmission is of a specific document, in a digital image forming device as an image transmission device according to yet another embodiment of the present invention.

Next, the following will explain operational processes in the digital image forming device according to the present embodiment in the case where a request for image data transmission is sent from an external device, such as the computer 3B or the like, via the Internet 5 and the LAN 6, with reference to FIG. 12. Note that, it is assumed that an original document for transmission is set at the scanning section 19 when the transmission request is sent.

When a communications request for the transmission of image data is sent from an external terminal, such as the computer 3B or the like, via the computer network (S401), first, based on a signal (information) sent from the external terminal is specified the external terminal (S402). As a result of the process in step S402, when the external terminal is specified, the external terminal thus specified is managed as the destination of the transmitted image data.

Thereafter, when, in a standby state, a request for transmission of a document image is sent from the external terminal (S403), the image data is prepared in a first memory 20 (S404). More specifically, the document is scanned by the scanning section 19, where image quality and density are set in accordance with the transmission request, so that the image data is generated, and the generated image data is captured by the scanning section 19 into the first memory 20 and temporarily stored there as the image data to be transmitted.

Next, a specific document judging section 22 makes comparison between the image data prepared in the first memory 20 and the sample data of one or more specific document stored in a third memory 21, thereby judging whether the image data captured into the first memory 20 is identical with the image data of a specific document (S107). When it is judged that the image data captured into the first memory 20 is not identical with the image data of any specific document, as with the process of image transmission shown in steps S807 to S819 of FIG. 10, the image data captured into the first memory 20 is transmitted to the transmission request side external terminal (S409).

On the other hand, as a result of judgment in step S405, when it is judged that the image data captured into the first memory 20 is identical with the image data of a specific document, address information (for example, when the computer network adopts a TCP/IP protocol, an IP address represented in such a format as "123.456.789.012") of the external device that requests the image data transmission, and/or information on the image data (image data of a specific document) to which the transmission request was sent is stored in the fourth memory 23 (S407). Next, a written warning against forgery is created at the written warning creating section 24, that is stored as image data for transmission in the first memory 20 (S408). Thereafter, the image data of the written warning is transmitted to the transmission request side computer 3B (S409).

As explained, in the present embodiment, even when there is a request for preparation and transmission of document image data is sent from the external computer 3B, if it is judged that the image data to be transmitted is identical with the image data of a specific document upon transmission of the image data prepared in the first memory 20 by allowing the scanning section 19 to scan the document, the storage content of the first memory 20 is erased so as to store only information indicating that the request for transmission of a specific document was sent, thereby preventing the image data of a specific document from being transmitted to the transmission request side computer 3B. Consequently, an output device (printer) of the transmission request side computer 3B cannot output (print out) the image of a specific document, thereby preventing the forgery of a specific document that may be enabled by the transmission of the image data of a specific document to the computer 3B.

Moreover, the digital image forming device according to the present embodiment, upon receipt of a request for transmission of a specific document, stores the address information of the transmission request side computer 3B, thereby making it possible to specify the computer 3B that attempted to commit the forgery of a specific document. Thus, it is possible to specify, for example, at which computer 3B an attempt of forging a specific document was made and track the activities of forgery.

Note that, it is also possible, in the case where the image data captured into the first memory 20 is identical with the image data of a specific document, that the control section 16 is provided with a function to store the identification information of the external terminal that sent a transmission request and prevent any future call from this external terminal. In that case, forgery by this external terminal can surely be prevented hereafter, including the forgery prevented this time.

Further, in the present embodiment, it is possible to control transmission of image data depending on a transmission request side device. It is possible, for example, that, in an environment having an image database established therein, the image database registering a plurality of images including images of specific documents whose information should be restricted when it is disclosed to some particular users, some information disclosure levels are set in advance for each transmission request side device, and the transmission (disclosure) of the image data of a specific document is controlled in accordance with an information disclosure level of the transmission request side device when the transmission of image data is requested. In addition, when thus controlling transmission in accordance with an information disclosure level of the transmission request side device, it is possible to previously classify terminals into two groups, one of which consists of terminals to which the transmission of the image data of a specific document is permitted, and the other consists of terminals to which the transmission of the image data of a specific document is prohibited.

[Fifth Embodiment]

Figure 13:
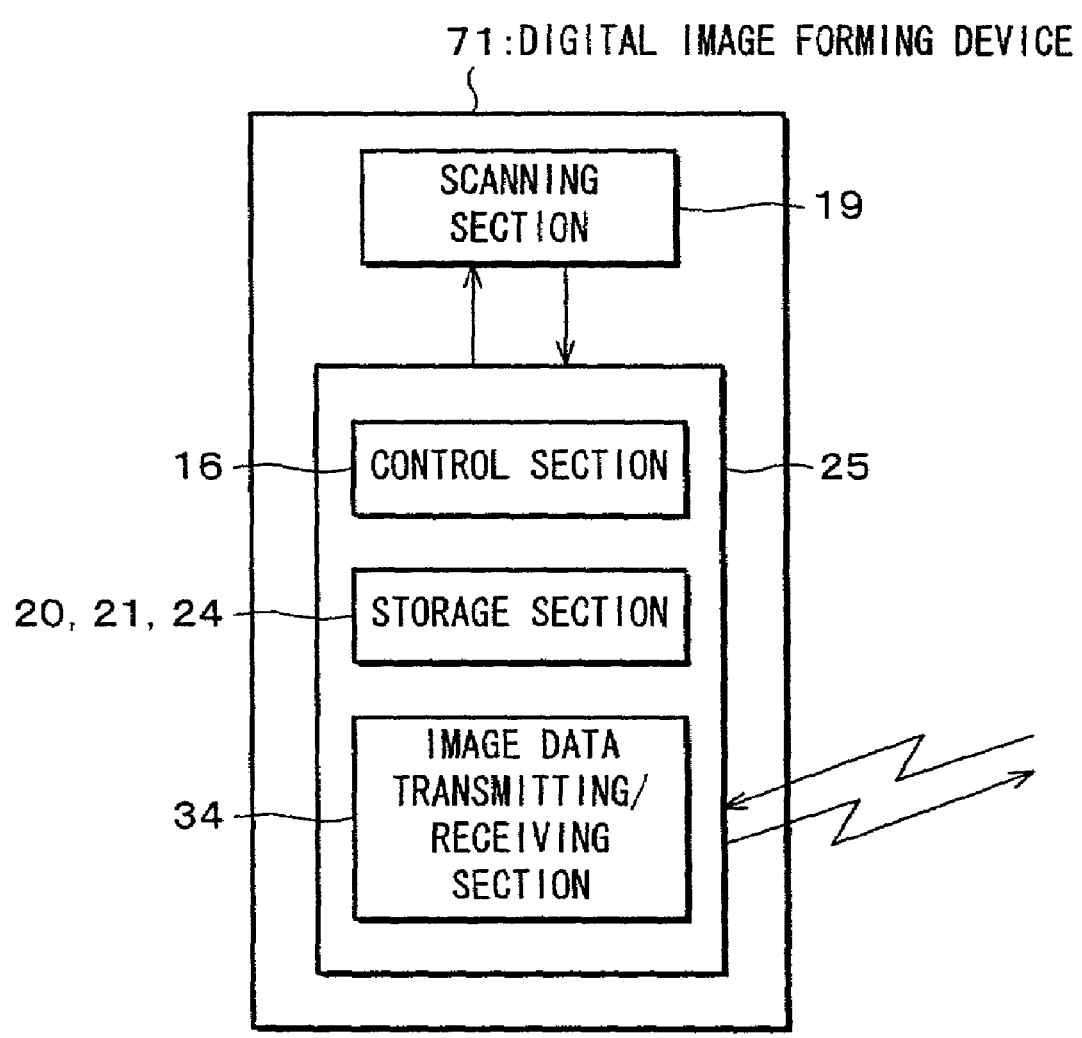
FIG. 13 is a block diagram schematically showing the digital image forming device of FIG. 7.

In the Third and Fourth Embodiments above has been explained, as schematically shown in FIG. 13, the digital image forming device 71 that integrally includes the scanning section 19, the control section 16, the storage sections (the first memory 20, the third memory 21 and the fourth memory 23), and a section 25 in charge of image transmission, such as the image data transmitting/receiving section 34 or the like.

Figure 14:
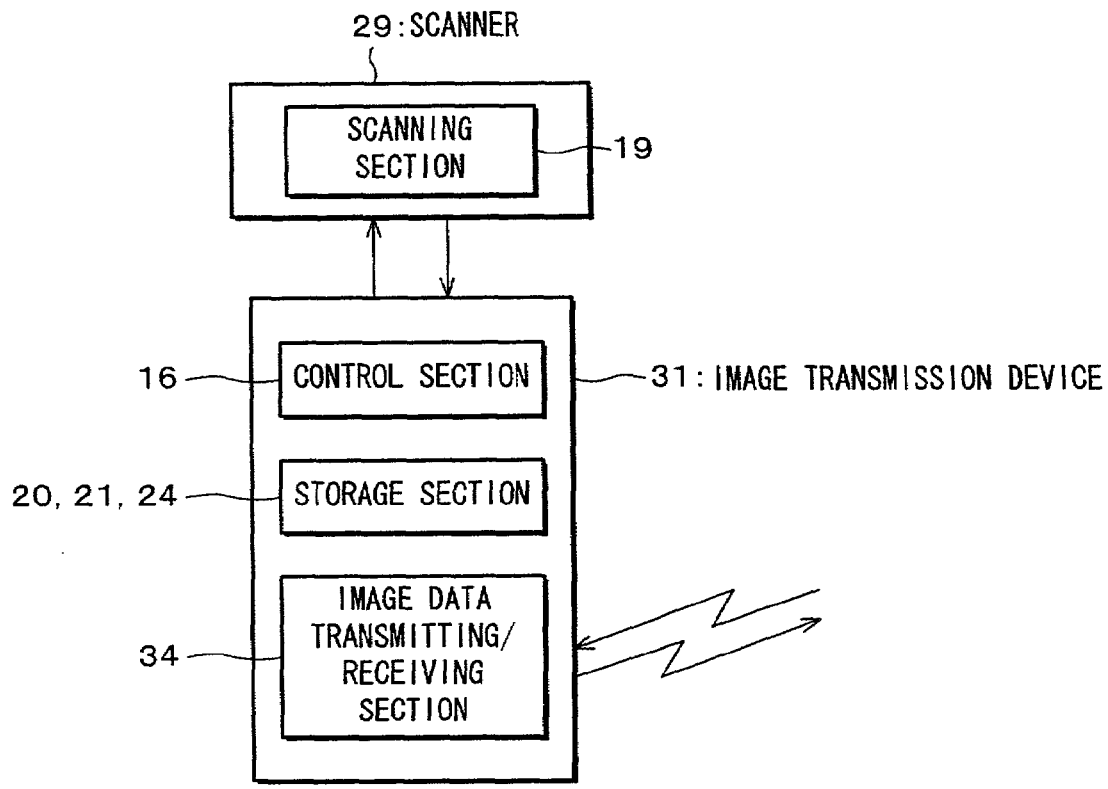
FIG. 14 is an explanatory view schematically showing an example of a system configuration including an image transmission device and a scanner, the image transmission device as being an image transmission device according to yet another embodiment of the present invention.

In contrast, as shown in FIG. 14, it is possible to configure a system by separately providing the scanning section 19 and the section 25 in charge of image transmission as a scanner (an external image transmission device) 29 and an image transmission device 31, respectively, and combining them.

With this configuration, in the case where a request for image data transmission is sent from an external device, such as a computer 3B, to the image transmission device 31 via the Internet 5 and a LAN 6, the control section 16 of the image transmission device 31 outputs a command to scan an original document to the scanner 29. Upon receipt of the instruction (command) from the image transmission device 31, in the scanner 29, the scanning section 19 scans the original document so as to transmit image data obtained from the document to the image transmission device 31. The image transmission device 31 stores the image data in the storage section (the first memory 20).

Thereafter, the image transmission device 31 transmits the image data from the image data transmitting/receiving section 34 to the computer 3B that sent the transmission request or another external device which was designated as the destination of transmission by the computer 3B.

Further, with this configuration, a separate control section may be provided in the scanner 29 in addition to the control section 16 of the image transmission device 31, or it is possible to control the scanner 29 by the control section 16 of the image transmission device 31.

Figure 15:
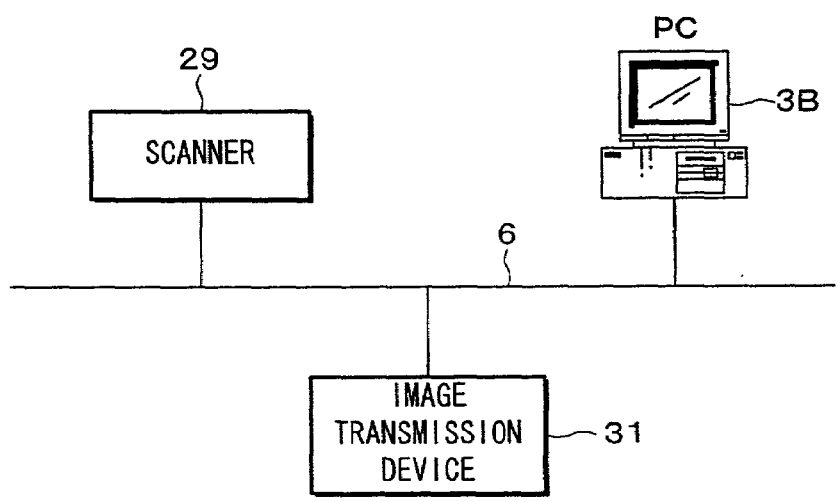
FIG. 15 is an explanatory view schematically showing an example of another system configuration including an image transmission device and a scanner, the image transmission device as being an image transmission device according to yet another embodiment of the present invention.

Further, as shown in FIG. 15, it is possible to use the scanner 29 and the image transmission device 31 in an environment where the scanner 29 and the image transmission device 31 are separately connected with the LAN 6.

With this arrangement, in the case where a request for image data transmission is sent from an external device, such as the computer 3B or the like, to the image transmission device 31 via the LAN 6, the image transmission device 31 outputs a command to scan an original document to the scanner 29. Upon receipt of the instruction (command) from the image transmission device 31, in the scanner 29, the scanning section 19 scans the original document so as to transmit image data obtained from the document to the image transmission device 31 via the LAN 6. The image transmission device 31 stores the image data in the storage section (the first memory 20).

Thereafter, the image transmission device 31 transmits the image data from the image data transmitting/receiving section 34 to the computer 3B that sent the transmission request or another external device which was designated as the destination of transmission by the computer 3B.

Further, with this arrangement, it is possible on one hand to allow the image transmission device 31 to control the scanner 29 based on a request for image data transmission which was sent from an external device, such as the computer 3B or the like, to the image transmission device 31, and it is possible on the other hand to control the scanner 29 directly by a request for image data transmission sent from an external device, such as the computer 3B or the like, to the image transmission device 31 and the scanner 29.

Note that, the image transmission device 31 according to the present embodiment is the same as the digital image forming device 71 according to the Third and Fourth Embodiments above except for the following points: (i) a printer 13 and a scanning section 19 are not provided; (ii) the image data transmitting/receiving section 34 serves also as an image receiving section to receive image data transmitted from the external scanner 29; and (iii) the control section 16 serves also as an image transmission request section to send a request for image data transmission to the external scanner 29 and thus controls the operation of the external scanner 29.

Further, in the image transmission device 31 according to the present embodiment, operational processes in the case where a request for image data transmission is sent from an external device, such as the computer 3B or the like, via the Internet 5 and the LAN 6 are the same as those of the digital image forming device 71 according to the Third or Fourth Embodiment above except for a point that the control section 16 sends a request for image data transmission to the external scanner 29 and captures the image data from the external scanner 29 instead of operating the scanning section 19.

Note that, in the foregoing embodiments, explanation has been made through the case where an external device from which a request for image transmission is sent and an external device to which the image is sent (an external receiving device) are the same. However, the external device from which a request for image transmission is sent and the external device to which the image is sent (the external receiving device) may be different.

As explained, an image transmission device according to the present invention, which is connected to an external device via a communications network and can be operated in accordance with a request from the external device, includes: an image scanning section for scanning a document image and generating image data; an image transmitting section for transmitting the image data to an external image receiving device in response to a request for transmission of the image data sent from the external device; a specific image judging section for judging whether or not the image data generated in the image scanning section is identical with specific image data; and a transmission control section for controlling the transmission of the image data in the image transmitting section based on a result of judgment by the specific image judging section. Further, a preferable embodiment of the image transmission device of the present invention further includes, in addition to the above sections, an image storage section for storing the image data generated in the image scanning section, wherein the image transmitting section, in response to the request for image data transmission, transmits the image data previously stored in the image storage section to an external receiving device. Further, another preferable embodiment of the image transmission device of the present invention further includes, in addition to the above sections, a control section which, in response to the request for image data transmission from an external device, controls the image scanning section to be activated and generate the image data so that the image data thus generated is transmitted from the image transmitting section. Further, it is preferable that the transmission control section, when it is judged that the image data is identical with the specific image data, prohibits or restricts the transmission of the image data by the image transmitting section.

With these arrangements, in the case where the image data generated in the image scanning section is judged to be specific image data, the transmission of the image data by the image transmitting section is controlled (preferably, prohibited, or restricted), thereby preventing the transmission of the image data of the specific document generated in the image scanning section (and particularly the image data of the specific document stored in the image transmission device). Therefore, it is possible to prevent the forgery of a specific document that is enabled by obtaining the image data of the specific document generated in the image scanning section from the outside.

Further, as explained, an image transmission device according to the present invention, which is connected to an external device via a communications network and can be operated in response to a request from the external device, includes: an image receiving section for receiving image data transmitted from an external image transmission device; an image transmitting section for transmitting the image data to an external image receiving device in response to a request for transmission of the image data sent from the external device; a specific image judging section for judging whether or not the image data received by the image receiving section is identical with specific image data; and a transmission control section for controlling the transmission of the image data in the image transmitting section based on a result of judgment by the specific image judging section. Further, a preferable embodiment of the image transmission device of the present invention further includes, in addition to the above sections, an image storage section for storing the image data received by the image receiving section, wherein the image transmitting section, in response to the request for image data transmission, transmits the image data previously stored in the image storage section to an external receiving device. Further, another preferable embodiment of the image transmission device of the present invention further includes, in addition to the above sections, an image transmission request section for sending a request for image data transmission to the external image transmission device in response to the request for image data transmission from the external device. Further, it is preferable that the transmission control section, when it is judged that the image data is identical with the specific image data, prohibits or restricts the transmission of the image data by the image transmitting section.

With these arrangements, in the case where the image data received from an external image transmission device is judged to be specific image data, the transmission of the image data by the image transmitting section is controlled (preferably, prohibited, or restricted), thereby preventing the transmission of the image data of the specific document received from the external image transmission device. Therefore, it is possible to prevent the forgery of a specific document that is enabled by obtaining from the outside the image data of the specific document externally inputted to the image transmission device.

Further, it is preferable that an image transmission device having the foregoing arrangements further includes a transmission request sender information storage section which, when it is judged that the image data is identical with the specific image data, stores information on an external device which requested the transmission of the image data.

With this arrangement, since the information on the external device which requested the transmission of the image data is stored, it is possible to specify the external device that attempted to commit the forgery of a specific document, thus making it possible to specify at which external device an attempt of forging a specific document was made and track the activities of the forgery.

Further, the arrangement including the transmission request sender information storage section can be arranged so that, when it is judged that the image data is the specific image data, a request for image data transmission from an external device that matches the information stored in the transmission request sender information storage section is refused. With this arrangement, it is possible to more surely prevent the forgery of a specific document that is enabled by obtaining the image data of the specific document from the outside.

Further, in the arrangement including the transmission request sender information storage section, a warning can be given to a person who attempted to commit the forgery of a specific document by such a method as to send a written warning to an external device at this person's end.

Further, the image transmission device having the foregoing arrangements may further include a specific image information storage section for storing information on the image data judged to be the specific image data.

As explained, an image transmission method according to the present invention includes the steps of: (i) inputting image data; (ii) judging whether or not the image data is specific image data; (iii) receiving a request for transmission of the image data via a communications network; and (iv) transmitting the image data in response to the request for transmission of the image data, wherein, in the step (iv), the transmission of the image data is controlled according to a result of judgment in the step (ii).

With this method, when it is judged that the inputted image data is specific image data, the transmission of the image data is controlled (preferably, prohibited, or restricted), thereby preventing the forgery of a specific document that is enabled by obtaining the image data of the specific document via the communications network.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image transmission device which is connected to an external device via a communications network and can be operated in accordance with a request from the external device, comprising:
   an image scanning section for scanning a document image and generating image data;
   an image transmitting section for transmitting the image data to an external image receiving device in response to a request for transmission of the image data sent from the external device;
   a specific image judging section for judging whether or not the image data generated in said image scanning section are identical with specific image data; and
   a transmission control section for controlling the transmission of the image data in said image transmitting section based on a result of judgment by said specific image judging section.

2. The image transmission device set forth in claim 1, further comprising:
   an image storage section for storing the image data generated in said image scanning section, wherein said image transmitting section, in response to the request for image data transmission, transmits the image data previously stored in said image storage section to an external receiving device.

3. The image transmission device set forth in claim 1, further comprising:
   a control section which, in response to the request for image data transmission from an external device, controls said image scanning section to be activated and generate the image data so that the image data thus generated are transmitted from said image transmitting section.

4. The image transmission device set forth in claim 1, wherein said transmission control section, when it is judged that the image data are identical with the specific image data, prohibits or restricts the transmission of the image data by said image transmitting section.

5. The image transmission device set forth in claim 1, further comprising:
   a transmission request sender information storage section which, when it is judged that the image data are identical with the specific image data, stores information about an external device which requested the transmission of the image data and/or the external image receiving device to which the information was to be sent.

6. The image transmission device set forth in claim 5, further comprising:
   call refusing means for refusing to receive a call from an external device which, according to the information stored in said transmission request sender information storage section, once sent a request for transmission of the specific image data.

7. The image transmission device set forth in claim 1, further comprising:
   warning means for, when it is judged that the image data are identical with the specific image data, giving a warning to an external device which requested the transmission of the image data.

8. The image transmission device set forth in claim 7, wherein said warning means transmits a written warning to the external device.

9. An image transmission device which is connected to an external device via a communications network and can be operated in response to a request from the external device, comprising:
   an image receiving section for receiving image data transmitted from an external image transmission device;
   an image transmitting section for transmitting the image data to an external image receiving device in response to a request for transmission of the image data sent from the external device;
   a specific image judging section for judging whether or not the image data received by said image receiving section are identical with specific image data; and
   a transmission control section for controlling the transmission of the image data in said image transmitting section based on a result of judgment by said specific image judging section.

10. The image transmission device set forth in claim 9, further comprising:
    an image storage section for storing the image data received by said image receiving section,
    wherein said image transmitting section, in response to the request for image data transmission, transmits the image data previously stored in said image storage section to an external receiving device.

11. The image transmission device set forth in claim 9, further comprising:
    an image transmission request section for sending a request for image data transmission to the external image transmission device in response to the request for image data transmission from the external device.

12. The image transmission device set forth in claim 9, wherein said transmission control section, when it is judged that the image data is identical with the specific image data, prohibits or restricts the transmission of the image data by said image transmitting section.

13. The image transmission device set forth in claim 9, further comprising:

a transmission request sender information storage section which, when it is judged that the image data are identical with the specific image data, stores information on an external device which requested the transmission of the image data and/or the external image receiving device to which the information was to be sent.

14. The image transmission device set forth in claim 13, further comprising:

call refusing means for refusing to receive a call from an external device which, according to the information stored in said transmission request sender information storage section, once sent a request for transmission of the specific image data.

15. The image transmission device set forth in claim 9, further comprising:

warning means for, when it is judged that the image data are identical with the specific image data, notifying an external device which requested the transmission of the image data of a warning.

16. The image transmission device set forth in claim 15, wherein said warning means transmits a written warning to the external device.

17. An image transmission device, comprising:

an image scanning section for scanning an image of a document;

first storage means for storing image data of the document scanned by said image scanning section;

specific document judging means for judging whether or not the document scanned by said image scanning section is a specific document; and warning means for, when the document is judged as the specific document by said specific document judging means, and a request for retrieving an image is sent from an external device with respect to image data of the document judged as the specific document, providing a warning to the external device.

18. An image transmission device, comprising:

an image scanning section for scanning an image of a document set;

first storage means for storing image data of the document scanned by said image scanning section;

specific document judging means for judging whether or not the document scanned by said image scanning section is a specific document;

storage control means for, when it is judged that the document is the specific document by said specific document judging means, clearing the image data stored in said first storage means while storing information indicating that the document is judged to be the specific document in second storage means; and warning means for, when an external device sends a request for retrieving the image data thus judged to be of the specific document and cleared from said first storage means, providing a warning to the external device.

19. The image transmission device set forth in claim 18, wherein, when the external device sends the request for retrieving the image data judged to be of the specific document and cleared from said first storage means, said storage control means stores at least an identification number of the external device in said second storage means.

20. The image transmission device set forth in claim 19, wherein, when the external device sends the request for retrieving the image data judged to be of the specific document and cleared from said first storage means, said storage control means stores at least information indicating that the request for retrieving the image data was sent, together with the identification number of the external device, in said second storage means.

21. The image transmission device set forth in claim 18, further comprising:

an output section for, when the external device sends the request for retrieving the image data judged to be of the specific document and cleared from said first storage means, outputting a report which at least includes an identification number of the external device and information indicating that the request for retrieving the image data was sent.

22. The image transmission device set forth in claim 19, further comprising:

call refusing means for, after the external device sends the request for retrieving the image data judged to be of the specific document and cleared from said first storage means, refusing any call from the external device having the identification number stored in said second storage means.

23. An image transmission method, comprising the steps of:

(i) inputting image data;

(ii) judging whether or not the image data are specific image data;

(iii) receiving a request for transmission of the image data from an external device via a communications network; and (iv) transmitting the image data to an external image receiving device in response to the request for transmission of the image data, wherein, in the step (iv), the transmission of the image data is controlled according to a result of judgment in the step (ii).

24. An image transmission method, comprising the steps of:

scanning an image of a document;

storing image data of the scanned document;

transmitting the stored image data to an external device;

judging whether or not the scanned document is a specific document; and giving a warning to an external device when the document is judged to be the specific document, and the external device sends a request for retrieving the image data judged to be of the specific document.

* * * * *